United States Patent
Mehler

(10) Patent No.: US 6,820,808 B2
(45) Date of Patent: Nov. 23, 2004

(54) RESILIENT BAR CODE AND SCANNER

(76) Inventor: Dan Mehler, 72 Shai Agnon St., 46325 Herzlia (IL)

( * ) Notice: Subject to any disclaimer, the term of this patent is extended or adjusted under 35 U.S.C. 154(b) by 0 days.

(21) Appl. No.: 10/156,924

(22) Filed: May 30, 2002

(65) Prior Publication Data

US 2002/0179709 A1 Dec. 5, 2002

Related U.S. Application Data

(60) Provisional application No. 60/293,990, filed on May 30, 2001.

(51) Int. Cl.[7] .............................................. G06K 7/14
(52) U.S. Cl. ...................................... 235/454; 235/436
(58) Field of Search ................................ 235/456, 375, 235/376, 436, 437, 462.01

(56) References Cited

U.S. PATENT DOCUMENTS

| | | | |
|---|---|---|---|
| 3,943,336 A | * | 3/1976 | Dillard et al. .......... 235/462.01 |
| 4,939,356 A | * | 7/1990 | Rando et al. .......... 235/472.01 |
| 5,026,058 A | | 6/1991 | Bromley |
| 5,320,808 A | * | 6/1994 | Holen et al. .................. 422/64 |
| 5,533,124 A | | 7/1996 | Smith et al. |
| 5,588,678 A | | 12/1996 | Young |
| 5,748,731 A | | 5/1998 | Shepherd |
| 5,884,029 A | | 3/1999 | Brush, II et al. |
| 5,905,248 A | | 5/1999 | Russell et al. |
| 5,929,420 A | * | 7/1999 | Cai ........................ 235/462.07 |
| 6,176,427 B1 | * | 1/2001 | Antognini et al. .......... 235/454 |
| 6,206,287 B1 | * | 3/2001 | Wasula et al. .......... 235/462.05 |
| 6,357,658 B1 | * | 3/2002 | Garczynski et al. ... 235/462.01 |
| 6,672,510 B2 | * | 1/2004 | Sauve .................... 235/462.07 |

* cited by examiner

Primary Examiner—Daniel St.Cyr
(74) Attorney, Agent, or Firm—G.E. Ehrlich (1995) Ltd.

(57) ABSTRACT

An optically readable digital bar code comprising two rows of printed spaces and non-printed spaces, one row being a calibration row for reading the data row; and a scanner having two optical reading heads controllably joined together and disposed side by side for reading the code and for converting it to data and outputting the data. Also shown is method of storing data as a bar code and a communication system including the bar code and the scanner. The bar code and scanner are useful within a method and system for authorizing and carrying out a financial transaction comprising providing an authorized user password and a single-use code carrier, both associated with a single-use transaction code which is associated with a transaction account; receiving the transaction code and the password for requesting authorization of a financial transaction; verifying the transaction code and the password; nullifying the transaction code for further use; and authorizing the financial transaction; the above steps being carried out via a communications network.

75 Claims, 9 Drawing Sheets

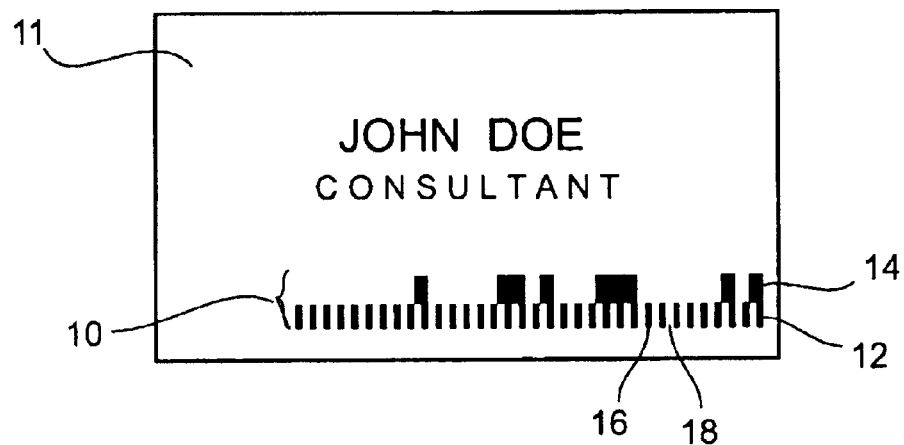
Fig. 1
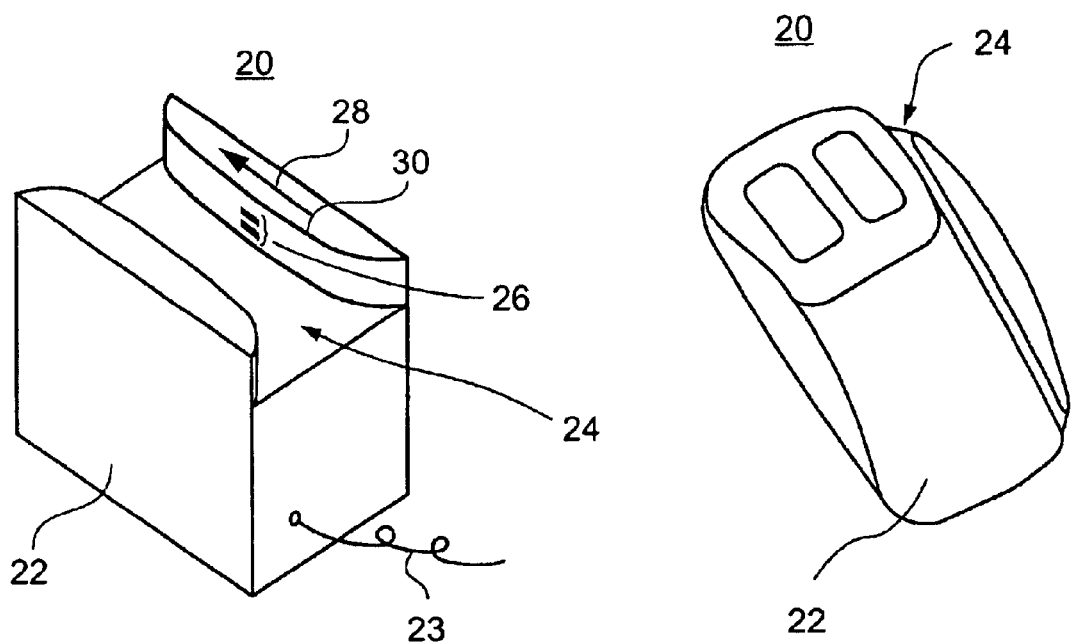
Fig. 2a
Fig. 2b

RESILIENT BAR CODE AND SCANNER

This application claims priority from co-pending U.S. Provisional Patent Application No. 60/293,990, filed May 30, 2001.

FIELD AND BACKGROUND OF THE INVENTION

The present invention relates to the field of optically readable bar codes and, more particularly, to a bar code that may be printed with less precision than current bar codes and a scanner for reading it. Also disclosed is a communication system including such a bar code and scanner. The present invention also relates generally to the field of commercial security and, more particularly, to a method and system for authorizing and carrying out a secure financial transaction.

Bar codes are everywhere. Modern man encounters data hidden within such code devices often throughout each normal day. Most commercial products have a price tag or product label with a barcode which is scanned in order to ring up the purchase price and/or identify the product for inventory control or other purposes. Passports and drivers licenses have information encoded on bar codes which are readable by the relevant authorities. Checks we write may have bar coded data on them which is scanned into our bank records.

The prior art reflects a wonderfully diverse and interesting array of applications for bar codes, including the following: U.S. Pat. No. 5,026,058 which describes introducing data into an electronic baseball game via a bar code; U.S. Pat. No. 5,533,124 which shows an electronic trading card system in which bar coded data is disposed on an insertable and removable medium; U.S. Pat. No. 5,588,678 which describes sound emitting cards having data thereon in the form of bar codes; U.S. Pat. No. 5,748,731 which shows electronic cards with copy protection using bar coded safeguards; U.S. Pat. No. 5,884,029 which describes the interaction with intelligent virtual objects, with data transferred by bar code; and U.S. Pat. No. 5,905,248 which shows a system and method for carrying out information related transactions using World Wide Web documents with URL encoded symbols carried by bar codes and other storage mediums. There is almost no end to the utility of bar codes for condensing, conveying and displaying data for many purposes.

However, if one examines present bar codes, one cannot but be impressed with the precision with which the parallel stripes are disposed on the substrate, be it a product label or any other object. Indeed, it is essential that bar codes be precise in the configuration and placement of the parallel lines and spaces. Any deviation in line thickness or relative spacing will result in misread data, with potentially serious consequences.

In order to be able to rely on the achievement of such precision, it is necessary to use a high quality printer that prints the entire bar code in a single press, for example an offset printer. Printers that print line-by-line, such as dot matrix, inkjet and laser printers, are susceptible to misspacing due to irregular feed speeds and other causes.

Printing in a single press is commercially feasible only for labels and other pre-printed substrates for which there is needed a large printing run of identical appearance. Single press printing is impractical for products for which there is only a limited quantity required, and makes it difficult to use bar codes for applications in which a large number of bar coded units are required, but with each having unique data, such as one time use cards or specific user identified products. It is commercially unfeasible to print individualized bar codes during the initial printing run of the substrate. For such units it is necessary to reprint on already printed substrates the uniquely different bar code needed. Such secondary printing is customarily done with a printer that prints in a line-by-line fashion, however the results do not achieve the same level of read accuracy as do the results of single press printing.

There is thus a widely recognized need for a readable bar code that may be individually printed with line-by-line printing methods on pre-printed substrates and which may be accurately read by an optical scanner.

E-commerce via the Internet is a growing segment of commerce in the world today, with transactions totaling billions of dollars annually. A substantial amount of E-commerce is consumer purchasing from commercial Websites, in which a consumer orders a product and pays for it by credit card via a computer, the transaction details being transmitted electronically over a communications network.

The dangers inherent in such a practice are well known. The methods used to breach the security of such transactions are equally well known and include invading the switching, transmission, and host computer components, for example, by use of so-called Trojan Horse programs, therewith compromising secret keys stored in a given user's personal computer, tampering with switches to redirect traffic, and intercepting and manipulating transmission facilities. Indeed, such practices are well known to hackers and are frequently transmitted around the World Wide Web for all to see.

In order to avoid such vulnerability, it is common for commercial enterprises to provide a method of payment that does not expose their clients' confidential information to the electronic communications environment. Such merchant independent payment mechanisms which utilize communication networks may provide a direct link from customer to vendor for ordering, but with payment effected in a manner that does not require electronic transmission, and thus, without the need to disclose credit card information. Accordingly, a known client may order and pay for a product without exposing his credit account to theft and misuse. However, this practice, at present, does not permit users to utilize conventional financial instruments such as credit cards, debit cards, and demand deposit account balances to pay for products.

Other merchant independent payment mechanisms, particularly those commonly employed by Web based enterprises, include a customer database which stores their clients' credit card details and utilizes conventional financial instruments to effect payment. This practice allows a client to order a product without exposing his credit account in the initial link to the merchant. However, the vulnerability remains in the subsequent link from the merchant to the credit supplier when obtaining authorization for the payment. It is widely known that this practice, even when transmissions are encrypted, only partially addresses the problem. Accordingly, the public remains rightly reluctant to pass on credit card information over the Internet.

Many payment solutions have been attempted that avoid the electronic security issue. One such idea is in the form of "gift certificates" either prepaid and issued by a merchant or association of merchants, or linked to a credit account and issued by a credit supplier, such as the AMERICAN EXPRESS GIFT CHECK program and the AMERICAN EXPRESS "BE MY GUEST" program, which allow payment via a credit account but which do not require the disclosure of credit card information. However, such certificates do not provide complete security as they may be misappropriated and used by an unauthorized user. They do, however, provide partial protection in that they cap potential losses to the face amount of the certificate.

Another proposed solution is in the form of convenience checks drawn on a credit account, or combination credit cards/gift certificates known as gift checks, which can be used much as travelers checks. These too may be stolen and used by unauthorized users.

A solution has been proposed in the form of single-use credit card numbers. The number can be used for one transaction only so that if intercepted while transacting business over the Internet, it is of no further use anyway. This solves the theft during use problem, but does not address the problem of an unused single-use number being misappropriated and used by an unauthorized user, as a stolen credit card might be so used.

Accordingly, a way is needed to provide secure payment by credit card over a communications network that is not subject to the abovementioned limitations and vulnerabilities.

SUMMARY OF THE INVENTION

Accordingly, it is an object of the present embodiments to provide a bar code that may be printed with less precision than present bar codes and that may be accurately read by an optical scanner despite small variations in configuration and spacing.

It is a further object of the present invention to provide a communication system using such a bar code to carry a telephone number and a scanner to read the number and send it to a user client to provide a communication address, for example, to command a telephone dialer to dial the number, or, alternatively, to provide a Web address or the like, or, in a particularly preferred embodiment, a personalized version of a web address.

It is a further object of the present invention to provide a single use transaction code and an authorized user password, both associated with a transaction account, which are usable together to effect a financial transaction.

It is a further object of the present invention to provide a method and a system for restricting the use of a single-use transaction code to an authorized user.

It is a further object of the present invention to provide a payment voucher and a credit voucher restricted to use by an authorized user.

According to one aspect of the present invention there is provided an optically readable printed digital code comprising in spatial association on a substrate a calibration row and a data row, arranged such that the calibration row provides a calibration for reading encoded data held in the data row.

According to another aspect of the present invention there is provided a scanner having at least two optical readers controllably joined together and disposed side by side for reading code side for reading code comprising juxtaposed rows of printed spaces and non-printed spaces, the reading heads being controllably associated together to use one of said juxtaposed rows as a positional reference for reading said code from said juxtaposed rows.

According to yet another aspect of the present invention there is provided a communication system comprising: an optically readable printed digital code disposed on a substrate, the code comprising a calibration row and at least one data row, the calibration row providing a calibration for reading at least one data row; (b) a scanner having a reader with at least two optical reading heads controllably joined together and disposed side by side for reading the code and for converting the code to network communication address information and for outputting the network communication address information; and (c) a communication enabled unit for receiving the network communication address information and for accessing a corresponding network communication address.

According to yet another aspect of the present invention there is provided a method of storing data as a bar code comprising: (a) converting data to a series of binary data bits; (b) setting a calibration row comprising regularly alternating printed spaces and non-printed spaces, such that each space is assigned a printed state or a non-printed state; (c) for successive positions opposite respective spaces in calibration row, encoding a successive series of binary data bits using a corresponding calibration row space state and a state of the bit, thereby to compile a data row comprising printed spaces and non-printed spaces based upon data such that the alternating printed spaces and non-printed spaces provide a reference to the data-based printed spaces and non-printed spaces; and (d) printing the calibration row and the data row on a substrate.

According to yet another aspect of the present invention there is provided a method of authorizing a financial transaction restricted to a password holder, comprising: (a) associating a single use transaction code with a user account of a user, (b) associating said transaction code with a predetermined maximum limit sum of money; (c) associating together the single use transaction code and a password; (d) providing the transaction code and the password to the user; (e) receiving the transaction code and the password, the receipt being for requesting authorization of the financial transaction involving a specified sum of money; (f) verifying a match between the transaction code and the transaction account, verifying the received password, and further verifying that the specified sum does not exceed the predetermined sum; (g) nullifying the transaction code for further use; and (h) authorizing the financial transaction.

According to yet another aspect of the present invention there is provided a method of authorizing a financial transaction restricted to a password holder, comprising: (a) associating a single use transaction code with a user account of a user, (b) associating said transaction code with a predetermined maximum limit sum of money; (c) associating together the single use transaction code and a password; (d) providing the password to the user; (e) encoding the single use transaction code in optically readable digital code readable by a scanner, the scanner being for converting the digital code to the transaction code and for outputting the transaction code to a first network enabled communication unit; (f) printing the optically readable digital code on at least one single-use code carrier; (g) issuing at least one single-use code carrier bearing the transaction code to the user, (h) receiving the transaction code and the password from a user of the first communication unit on a second network enabled communication unit via a communications network, the receipt being for requesting authorization for a transaction involving a specified sum of money; (i) verifying a match between the transaction code and the transaction account, verifying the received password, and further verifying that the specified sum does not exceed the predetermined sum; (j) nullifying the transaction code for further use; and (k) authorizing the transaction and communicating the authorization to a user of the first communication unit by a user of the second communication unit via the communications network.

According to a yet further aspect of the present invention there is provided a method of securely carrying out a financial transaction, comprising: (a) receiving at least one authorized user password associated with a transaction code; (b) receiving at least one single-use code carrier bearing a transaction code associated with a transaction account printed thereon in an optically readable digital code; (c) presenting the code carrier and the password for verification in order to receive authorization for the financial transaction; (d) receiving verification of a match between the transaction code and the transaction account and verification of the password; and (e) receiving authorization for the transaction.

According to a still further aspect of the present invention there is provided a system for providing authorization for a financial transaction, comprising: (a) at least one authorized user password associated with a single-use transaction code; (b) at least one single-use code carrier bearing the transaction code associated with a transaction account managed by a manager and printed thereon in an optically readable digital code; (c) a first network enabled communication unit operated by a user; (d) a scanner for optically reading the digital code and for outputting the transaction code to the first communication unit; (e) a second network enabled communication unit operated by the manager; and (f) a communications network for communicating with the first communication unit and with the second network communication enabled unit; such that the scanner reads the digital code and outputs the transaction code to the first communication unit, the first communication unit communicates the transaction code and the password via the communications network to the second communication unit for verification, and, upon condition that the transaction code and the password are verified, the transaction code is nullified for further use and the financial transaction is authorized.

According to features in the described preferred embodiments the digital code further comprises at least one additional data row arranged such that the calibration row provides a calibration for reading encoded data from it.

According to features in the described preferred embodiments the rows are linear rows.

According to features in the described preferred embodiments the calibration row and the data row comprise a single printing alignment.

According to features in the described preferred embodiments the calibration row is juxtaposed to the first data row and to the additional data row and serves as a reference to the data rows.

According to features in the described preferred embodiments each of the rows comprises printed spaces and non-printed spaces, the calibrated data being carried within the code by the referential juxtaposition of the printed spaces and the non-printed spaces.

According to features in the described preferred embodiments the calibration row comprises regularly alternating printed and non-printed spaces.

According to features in the described preferred embodiments the data row comprises data dependent printed and non-printed spaces such as to carry data as a same/different contrast between corresponding spaces of the calibration and data rows.

According to features in the described preferred embodiments each space in the data row is aligned to correspond to a respective space of the calibration row.

According to features in the described preferred embodiments each of the rows is readable sequentially from one end to the other end.

According to features in the described preferred embodiments the code comprises a binary code.

According to features in the described preferred embodiments the code is decodable for storage on an electronic medium, the binary code representing data consisting of numbers, letters of the alphabet and/or symbols.

According to features in the described preferred embodiments the rows are readable by an optical scanner having at least two optical readers controllably joined together and disposed side by side for reading the rows simultaneously.

According to features in the described preferred embodiments the scanner is for reading the rows from one end to the other end.

According to features in the described preferred embodiments the scanner is for converting the code to data and outputting the data.

According to features in the described preferred embodiments the data comprises identification information, personal information including a telephone number and security related data, authorization for a business transaction, a World Wide Web site address and/or information relevant to a commercial product.

According to features in the described preferred embodiments the code provides access to a remotely located database entry associated with a user.

According to features in the described preferred embodiments the database entry is enabled for automatic data output.

According to features in the described preferred embodiments the printed spaces are arranged in substantially rectangular form.

According to features in the described preferred embodiments the substrate comprises paper.

According to features in the described preferred embodiments the substrate is a pre-printed business card and/or a pre-printed label.

According to features in the described preferred embodiments the substrate includes an adhesive.

According to features in the described preferred embodiments the scanner further comprises a converter for converting the code to data.

According to features in the described preferred embodiments the two optical readers are disposed at a side of the scanner.

According to features in the described preferred embodiments the user client is selected from the group consisting of a computer, a POS (point of sale) system, a portable computing device such as a PDA, a cellular telephone having Internet capabilities (e.g., wireless application protocol) and a Web TV.

According to features in the described preferred embodiments the user client includes a database for storing data, the network communication address information being stored in the database.

According to features in the described preferred embodiments the communication unit is a user client.

According to features in the described preferred embodiments the communication unit is a telephone dialer.

According to features in the described preferred embodiments the printing is carried out by a printer that prints line by line.

According to features in the described preferred embodiments the transaction code is a unique code.

According to features in the described preferred embodiments the transaction account is a credit account and the transaction code is associated with a valid credit card number.

According to features in the described preferred embodiments the transaction account is a bank account and the transaction code is associated with a bank account number.

According to features in the described preferred embodiments the transaction account is an asset fund and the transaction code is associated with a fund identifying designation.

According to features in the described preferred embodiments the transaction account is an asset fund and the transaction code is associated with the asset fund.

According to features in the described preferred embodiments the predetermined sum is indicated on the code carrier.

According to features in the described preferred embodiments the transaction code is printed on the code carrier.

According to features in the described preferred embodiments the transaction code is printed on the code carrier in an optically readable digital code.

According to features in the described preferred embodiments the digital code is a bar code.

According to features in the described preferred embodiments the bar code comprises in spatial association at least two linear rows comprising a calibration row and at least one data row, arranged such that the calibration row provides a calibration for reading encoded data carried by the data row.

According to features in the described preferred embodiments the calibration row and the data row comprise a single printing alignment, the calibration row being juxtaposed to the data row and serving as a reference to the data row.

According to features in the described preferred embodiments each of the rows comprises printed spaces and non-printed spaces configured in substantially rectangular form.

According to features in the described preferred embodiments the calibration row comprises regularly alternating printed and non-printed spaces, the data row comprises data dependent printed and non-printed spaces with each space being aligned to correspond to a respective space in the calibration row, such as to carry data as a same/different contrast between corresponding spaces of the calibration row and the data row, the spaces being readable sequentially.

According to features in the described preferred embodiments the digital code is an encryption of the transaction code.

According to features in the described preferred embodiments the digital code is an encryption of the password.

According to features in the described preferred embodiments the digital code contains the predetermined sum.

According to features in the described preferred embodiments the digital code contains an arbitrary number associated with the user for identifying said transaction account.

According to features in the described preferred embodiments the digital code comprises a binary code decodable for storage on an electronic medium, the binary code encoding data constituting the transaction code.

According to features in the described preferred embodiments the rows are readable by an optical scanner having at least two optical reading heads controllably joined together and disposed side by side for reading the rows simultaneously and from one end to the other end.

According to features in the described preferred embodiments the scanner is for converting the code to data and outputting the data to an electronic medium.

According to features in the described preferred embodiments the electronic medium comprises at least two network enabled communication units for receiving and transmitting the data via a communications network, and a communications network.

According to features in the described preferred embodiments the two communication units are user clients selected from the group consisting of a computer, a portable computing device, a cellular telephone having data capability and a Web TV.

According to features in the described preferred embodiments at least one of the communication units includes a database for storing data, the transaction code and the password being storable in the database.

According to features in the described preferred embodiments the communications network is the Internet.

According to features in the described preferred embodiments the code carrier is one or more of the group consisting of paper, plastic, a pre-printed check, a pre-printed facsimile of a check, a credit card and a facsimile of a credit card.

According to features in the described preferred embodiments the manager is selected from the group consisting of a banker, a fund manager and a credit supplier.

The present invention successfully addresses the shortcomings of the presently known configurations by providing a resilient bar code that is less precise than current bar codes and a scanner for reading it.

The present invention also successfully addresses shortcomings of the presently known configurations by providing a user password associated with a single use transaction code to effect a financial transaction and to provide authentication that the transaction is being effected by an authorized user.

BRIEF DESCRIPTION OF THE DRAWINGS

With specific reference now to the drawings in detail, it is stressed that the particulars shown are by way of example and for the purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

In the drawings:

FIG. 1 is a simplified diagram of a card carrying a bar code, constructed in accordance with a first embodiment of the present invention;

FIG. 2a is a simplified schematic diagram showing a perspective view of a scanner for reading the bar code of FIG. 1;

FIG. 2b is a simplified schematic diagram showing a perspective view of the scanner of FIG. 2a configured in combination with a computer mouse;

FIG. 5b is a simplified diagram of the back side of the code carrier of FIG.5a;

DESCRIPTION OF THE PREFERRED EMBODIMENTS

Figure 3:
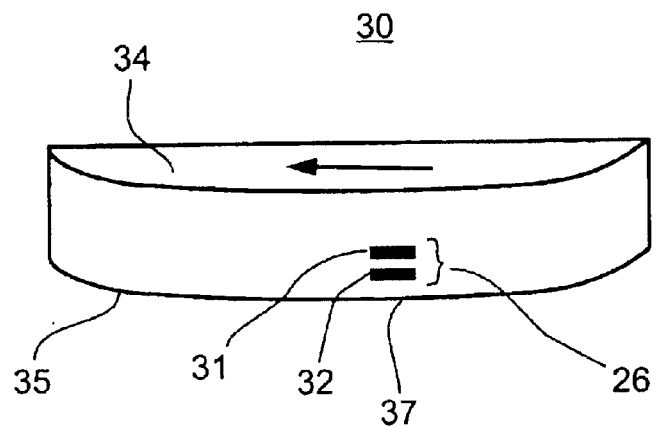
FIG. 3 is a simplified diagram showing the optical readers of the scanner of FIG. 2.

Before explaining at least one embodiment of the invention in detail, it is to be understood that the invention is not limited in this application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The principles and operation of a bar code and scanner according to the present invention may be better understood with reference to the drawings and accompanying descriptions.

Reference is now made to FIG. 1 which shows a bar code in accordance with the teachings of the present invention, which is referred to hereinafter as bar code 10. Bar code 10 is an optically readable digital code which is printed on a substrate, hereinafter referred to as substrate 11. For the purposes of this specification and claims, substrate 11 may be paper or any paper product, including those with an adhesive, or any object or surface on which bar code 10 may be printed, such as a preprinted label on consumer products, a preprinted business or calling card, a collectible card or document, an identification card or document, a credit or debit card or any card, document or surface on which coded data may be printed for reading by a reader.

According to the preferred embodiment, bar code 10 includes two linear rows juxtaposed to one another. One row is a calibration row, hereinafter referred to as calibration row 12, and the other row is a data row, hereinafter referred to as data row 14. Calibration row 12 provides a calibration for reading encoded data from data row 14. It is understood that bar code 10 may also include additional rows which may also be disposed in such a manner that one row provides a calibration for reading encoded data from an adjacent row. It is further understood that the rows need not be linear, but may be arranged in any configuration that maintains the calibration relationship one to another and that provides access for optical reading.

Calibration row 12 and data row 14 both comprise printed spaces, hereinafter referred to as printed space 16, and non-printed spaces, hereinafter referred to as non-printed space 18. According to the preferred embodiment, printed space 16 is arranged in substantially rectangular form. It is appreciated that printed space 16 may be arranged in other forms, according to the requirements of the relevant use and provided that it is readable.

Each row of bar code 10 consists of a series of printed spaces 16 and non-printed spaces 18, with the rows juxtaposed to each other such that the printed spaces 16 and the non-printed spaces 18 of one row are disposed next to, and provide a reference for, the printed spaces 16 and the non-printed spaces 18 of the other row. It is this referential juxtaposition of spaces that carry the data within the code.

The printed spaces 16 and the non-printed spaces 18 of calibration row 12 serve to align the reader and provide a series of reference points from which to begin reading. Such reference points are repeated throughout calibration row 12 in order to realign the reader to the juxtaposed spaces to be read. This calibration function is essential because bar code 10 is read sequentially from one end to the other, and only the referentially juxtaposed printed and non-printed spaces are read. There are no gaps between such spaces. Any imprecision of spacing simply results in a mis-sized printed or non-printed space, which has no meaning to the scanner, unlike typical bar codes, in which the spacing has a meaning and a mis-sized gap results in misread data. Periodic calibration is needed in order to signal the scanner that a new space has been reached. This periodic signaling is necessary to avoid misreading bar code 10 which, because it is useful as a secondarily printed bar code, may be imprecisely printed.

Originally printed bar codes which are part of an initial printing run of a substrate are typically precise and uniform. Such bar codes are read by readers which read both the lines and the gaps between the lines. Secondarily printed bar codes which are printed on already printed substrates, often have unique or variable data and differences in their content, such as a serial progression of data, such as running numbers, which requires a change in the configuration of printed and non-printed spaces for every unit printed. Such secondary printed bar codes may be imprecise with varying gaps between the printed spaces and non-printed spaces. Such irregularities in printing may result from mistimed positioning of the variable data, non constant printer feed speeds or other mechanical causes. Bar codes with such irregularities will cause a misread. Accordingly, it is necessary to both have a bar code in which gaps between the spaces do not exist or do not matter, and to calibrate the reader to know when each new space begins. Unlike prior art bar codes, bar code 10 has no gaps between the spaces. Therefore spacing between sequential spaces is not an issue. Calibration row 12 consists of alternating printed spaces and non-printed spaces and periodically signals the reader when a new space has been encountered and is to be read. This calibration is repeated periodically throughout the length of the rows.

As stated earlier herein, printed spaces 16 and non-printed spaces 18 of calibration row 12 provide a reference for printed spaces 16 and non-printed spaces 18 of data row 14. For example, a printed space 16 of calibration row 12 may be adjacent to and therefore refer to either a printed space 16 or a non-printed space 18 of data row 14, resulting in a black-black or black-white configuration respectively. Similarly, a non-printed space 18 of calibration row 12 may refer to either a printed space 16 or a non-printed space 18 of data row 14, resulting in a white-black or white-white configuration respectively. This referential juxtaposition of the spaces in one row with the spaces in the other row carries the data within bar code 10.

An alternate embodiment of bar code 10 is a three-row configuration with calibration row 12 referring to two data rows, both disposed adjacent to calibration row 12 on either side thereof. In this juxtaposition, the combination of printed space 16 and non-printed space 18 includes three spaces, resulting in eight possible configurations, as follows: black-white-black, black-white-white, black-black-white, black-black-black, white-white-black, white-white-white, white-black-white and white-black-black. As in the preferred embodiment described above, the referential juxtaposition of the spaces in one row with the spaces in the other rows carries the data within bar code 10.

Bar code 10 is decodable to a binary code. Therefore, the variables needed are limited. The above described referential juxtaposition of two rows results in only two possible combinations of printed and non-printed spaces, each of which corresponds either to the "1" or the "0" of the binary code. According to the preferred embodiment, a same color configuration, such as white-white or black-black is preferably read as a "0", a different color configuration, such as black-white or white-black is preferably read as a "1". The above described referential juxtaposition of three rows results in four possible combinations of printed and non-printed spaces, each of which may correspond to two units of binary code. For example, each segment of two spaces in each combination of three spaces may be read as described above, same color as "0" and different color as "1". There are two such segments in each combination, as calibration row 12 serves double duty as a reference to each data row. Therefore, a combination of black-white-black will be read as "11", a combination of white-white-black will be read as "01", etc. Further bits can be added by the addition of further rows.

Other ways of mapping binary symbols onto the printed/non-printed space combinations may be considered by the skilled person. Binary codes are well known in the art and therefore do not require further explanation herein.

The binary code is decodable to data consisting of numbers, letters of the alphabet or symbols. The binary code and the data it represents are storable on an electronic medium and are therefore capable of being sent, received, stored and used by a user client for all applications that are within its capability. For purposes of this specification and the accompanying claims, the phrase "user client" generally refers to a computer and includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystem™; or any other known and available operating system; POS (point of sale) systems; portable computing devices such as personal digital assistants (PDA); cellular telephones having Internet capabilities (e.g., wireless application protocol); and Web TVs.

Reference is now made to FIG. 2a which shows an optical scanner, hereinafter referred to as scanner 20, which is similar in physical configuration to a magnetic card reader wherein a magnetic strip on a card is swiped through a slot and is read as it passes a reader within the slot. According to the preferred embodiment, scanner 20 includes a body or console hereinafter referred to as body 22 which is connected to a user client by a hard wire connection 23. Body 22 has disposed thereon a guidance slot, hereinafter referred to as slot 24, through which substrate 11 is passed in order for bar code 10 to be read by an optical reader, hereinafter referred to as reader 26. Reader 26 is similar to those bar code readers well known in the art and is typically infrared or laser based, converting an optical signal into an electrical signal. The technology of such optical readers is not germane to the present invention and may develop as optical technology develops and therefore requires no further description herein.

Body 22 also has indicated thereon in close proximity to slot 24 a direction pointer in the form of an arrow, hereinafter referred to as direction indicator 28, indicating the direction in which substrate 11 is to be introduced into slot 24 in order for bar code 10 to be read in the proper sequence by reader 26. Reader 26 is disposed upon reading face 30, which is disposed within slot 24, such that bar code 10 passes over it when substrate 11 is passed through slot 24 and across reading face 30. The location of reader 26 on reading face 30 corresponds in spacing to the location of bar code 10 on substrate 11 such that when substrate 11 is fully inserted into slot 24, bar code 10 aligns with reader 26.

It is understood that the abovedescribed configuration of scanner 20 is solely exemplary and scanner 20 may be configured otherwise. For example, as depicted in FIG. 2b, scanner 20 is configured in combination with a computer mouse. In this example, body 22 is also the body of the mouse and slot 24 is simply a guidance slot formed on the side of and within the contours of body 22. Scanner 20 may be housed within a user client and connected thereto internally, with only slot 24 extending visibly, in which case it is employed as described above. Scanner 20 may also be configured as a hand-held scanner, in which case it preferably has a directional and placement aid such as a channel or an extending ridge or flange in order to provide physical guidance to substrate 11 as it passes over reading face 30 such that bar code 10 may pass directly over reader 26 and be read.

In addition to reading bar code 10, scanner 20 is designed to convert the code to data and to output that data, preferably to a user client. In this respect, scanner 20 employs current technology to both convert the optical signal read to an electrical signal and to send that electrical signal for use and storage on an electronic medium according to the current application. Scanner 20 may preferably be configured with an identity code which serves to identify it and which is similarly outputted along with the data.

Reference is now made to FIG. 3 which shows reading face 30 on which is disposed reader 26. Reader 26 is located a predetermined distance from the top edge of reading face 30, hereinafter referred to as top edge 34, and from the bottom edge of reading face 30, hereinafter referred to as bottom edge 35. Scanner 20 is designed to read bar code 10 which, according to the preferred embodiment, contains two juxtaposed rows of spaces. Accordingly, reader 26 preferably consists of two optical reading heads, hereinafter referred to as upper optical reading head 31 and lower optical reading head 32 respectively. Upper optical reading head 31 and lower optical reading head 32 are juxtaposed to one another and disposed upon reading face 30 such that upper optical reading head 31 reads calibration row 12 and lower optical reading head 32 reads data row 14. According to the preferred embodiment, upper optical reading head 31 and lower optical reading head 32 are positioned with respect to the top edge 34 and bottom edge 35 of reading face 30 such that they will align with calibration row 12 and data row 14 respectively when substrate 11 is passed through slot 24. To assure such alignment, the distance 37 between reader 26 and bottom edge 35 is equal to the distance between bar code 10 and its proximal edge of substrate 11.

It is understood that the relative positions of calibration row 12 and data row 14 may change in different embodiments of bar code 10 and therefore the relative positions of upper optical reading head 31 and lower optical reading head 32 may also change in order to remain consistently aligned according to the configuration of bar code 10. It is further understood that the distance between bar code 10 and the proximal edge of substrate 11, as well as distance 37, may change in further embodiments. The embodiments contemplate all such variations in configuration and disposition, although preferably providing alignment between bar code 10 and reader 26.

When bar code 10 is passed over reader 26, both upper optical reading head 31 and lower optical reading head 32 read their respective rows sequentially, and both rows are read simultaneously. Upper optical reading head 31 and lower optical reading head 32 are controllably joined together such that the referential juxtaposition of the optical signals respectively read from calibration row 12 and data row 14, either same color or different color, produces the required electrical signal indicating the binary code which represents the calibrated data carried by barcode 10.

The calibrated data carried by the code consists of numbers, letters of the alphabet and symbols. Accordingly, the data encoded by bar code 10 may consist of any combinations of the above listed calibrated data and therefore may include identification information such as a name, social security number, drivers license number and the like; personal information such as address, phone number and security related data such as a PIN or other secret code needed for access to a secure environment; authorization or other required data to enable a business transaction such as a credit purchase; and/or electronic medium related data such as a Web site address, URL or link.

Bar code 10 is compatible with the full range of applications for which bar codes are presently used and additionally to applications requiring individualized bar codes. One particular application for which bar codes are not widely in use, and for which individualized bar codes would be particularly advantageous, is a communication system in which a bar code is employed either to convey communication data or to effect the communication. Accordingly, a preferred embodiment of the present invention relates to the communication system illustrated in FIG. 4, hereinafter referred to as system 40. System 40 comprises substrate 11 on which is printed bar code 10; scanner 20; a communication enabled user client which, according to the preferred embodiment, is a computer and is hereinafter referred to as computer 44; and a telephone dialer, hereinafter referred to as dialer 46.

System 40 serves to promote business, personal and professional contacts via electronic communication, including potentially utilizing the internet. According to a preferred embodiment of system 40, substrate 11 preferably includes a plurality of calling cards which, for the purpose of this description, is hereinafter referred to as calling card 11, each printed with bar code 10 which is decodable to a unique identification code and preferably user specific information. A user of system 40 preferably swipes calling card 11 through scanner 20, which includes reader 26, an optical reader for reading each identification code on each calling card 11. The code is converted, as described hereinbefore, to identification data including network communication information, which, according to the preferred embodiment, includes a telephone number, and transmits the telephone number to computer 44. Scanner 20, if configured with an identity code, may also preferably transmit the identity of the scanner which scanned calling card 11. According to the preferred embodiment, data is transmitted by scanner 20 via hardwire connection 23, although it is understood that scanner 20 may alternatively be designed to send data by wireless communication such as Infrared or Radio Frequency, and therefore may be configured with a wireless port. In such a case, computer 44 will also be configured for wireless communication and will be equipped with compatible communication ports.

Computer 44, upon receiving the identification data from scanner 20, may store the data, including the telephone number, in an internal database 47. In addition, computer 44 may command dialer 46 to dial the indicated telephone number. The call is made via a modem, hereinafter referred to as modem 48, which may be internal to computer 44 as shown in the preferred embodiment or may be external to computer 44.

Figure 4:
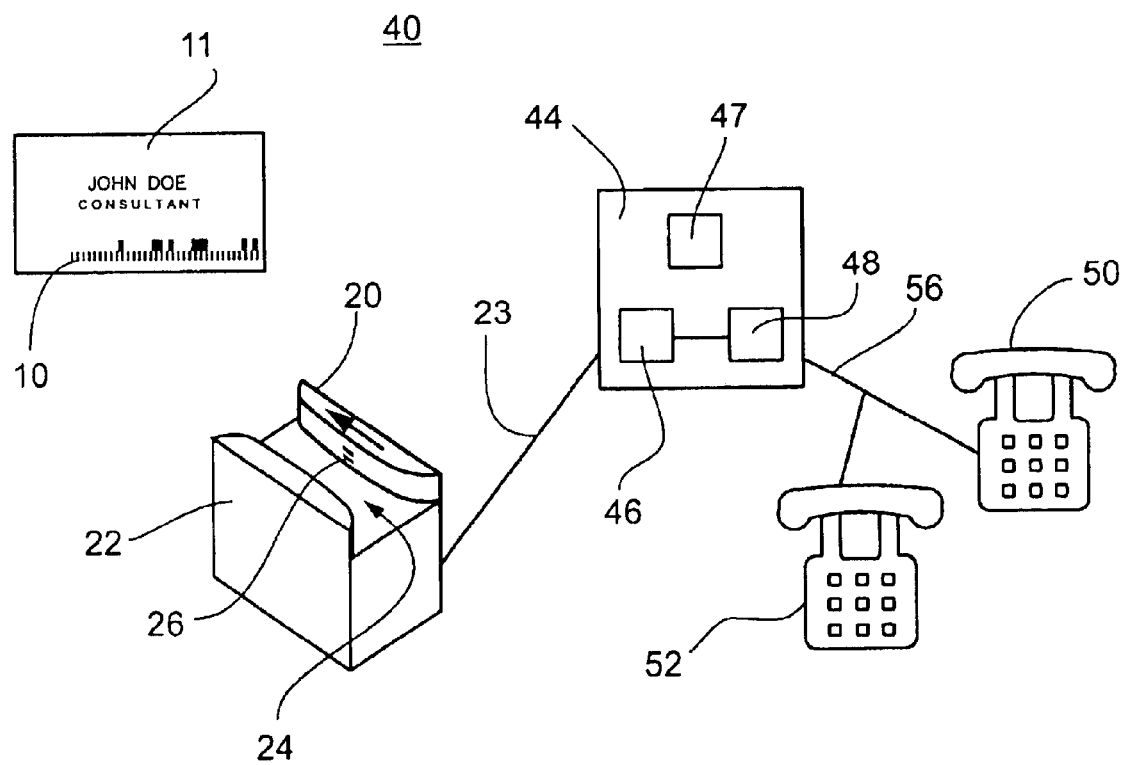
FIG. 4 is a simplified schematic diagram illustrating a communication system involving the bar code of FIG. 1.

The purposes of the telephone call may vary. The call may be to a private telephone, in which case modem 48 sends the call to remotely located telephone unit 50. The connection may be made via telephone line 56 as shown in FIG. 4, or may be via wireless communication as previously described. In this case, there is a local telephone unit 52 for use by the user who swiped the card who will be waiting on unit 52 for the call to be dialed by dialer 46 and answered by remote telephone unit 50. System 40 thus enables a user to dial up real world contacts, including fax machines, by swiping a calling card.

System 40 also enables links to the internet thus accessing virtual world contacts. Accordingly, calling card 11 may have encoded the telephone number of an Internet service provider, in which case the computer may go online and the result will a connection to another user client to convey data by Email. Another virtual contact may be to a Website. For this application, the identification code may also include an Internet address or URL and the result of swiping calling card 11 will be to access a Web site. In such cases there is no intervening telephone unit. Such an application very obviously has a wide range of uses, for example accessing specific computer programs such as games or business related applications.

In a further variation the user client may have a ready programmed Internet connection. The card 11 may carry data that provides a username and or password to automatically connect to a specified account. Thus different users may use the same computer to connect to the same Internet service provider.

System 40 may also be used to save and retrieve information from a database. By using system 40, a user need not key in information to a database. The required information may be encoded in bar code 10 on calling card 11 and may, when calling card 11 is swiped through scanner 20, be sent to a central Application Service Provider for storage and for assignment of an identification number for access thereto. The same principle applies to retrieving information from a database. The user need not key in search information or key words into computer 44 in order to identify the information sought. Bar code 10 may include a coded identification number. When calling card 11 is swiped through scanner 20, the identification number is sent to a central Application Service Provider which recognizes the identification number and conveys stored information related to the identification number, which may include graphics, sound, etc. to computer 44 for display. Such an application is particularly useful to avoid the repetitive burden of filling out the forms associated with e-commerce, in that the information related to the identity number may be personal information that can be automatically added to the form. One way of achieving this is for users to have a database entry with personal information and for the service provider to have encoded versions of the e-commerce form. When making a purchase over the Internet, the user simply swipes calling card 11 through scanner 20 to access his database entry and have all relevant data inserted into the required forms.

The utility of system 40 is thus to facilitate communication and/or information exchange simply by swiping a card with unique or one time use data through a scanner. Such a system will obviate many of the steps needed to carry out these functions and will alleviate much of the disincentive presently faced by computer users to use their computers for these purposes.

In summary, bar code 10 is compatible with the full range of applications for which bar codes are presently used. Its advantage is that it may be employed for a wider range of uses than present bar codes and therefore will make bar codes feasible for many applications which presently do not use bar codes because of the need for small print runs and individualized data.

Some of the applications for which bar code 10 is appropriate include those with restricted personal access, such as online banking, licensing, etc. Bar code 10 with an identification code and/or a password may be combined with a smart card which contains the relevant personal information so that personal or restricted access business may be conducted with an added layer of security.

Bar code 10 may be issued for the purpose of logging and recording a series of sequential steps in a process or stops on a route in order to both provide a record and to document information received. Specific applications of such a use include a patient entering a hospital for tests and procedures. By swiping calling card 11 into scanners at each hospital department or station, a record is formed and kept which may be referred to thereafter for oversight or for follow-up. Another specific application is that of a visitor to an exhibition or to a museum. By swiping calling card into each position or display visited, a record is formed of the visit, which can be stored to a database server and retrieved thereafter. Moreover, each station or display will also form a record of each visitor thereto, which can also be stored on a database server and recalled thereafter. Such personalized recording may include any information that is encodable by bar code 10.

Other applications for which bar code 10 is appropriate include use in one-time-only security codes or daily changing passwords. Such often changing codes and passwords find wide usage in commerce as vouchers for stores, internet vouchers, etc. Indeed, it is common marketing practice to offer one time only discounts or prizes to selected customers or potential customers. Such discounts and prizes may be awarded in many ways, often by the distribution of a voucher or an award certificate entitling the bearer or an identified individual to receive the award. Such a voucher or certificate may employ a one-time-use code in order to prevent duplicate awarding. Bar code 10 may be used to contain and display the code.

In a particularly preferred embodiment the card may comprise a website address together with configuration information allowing personalization of the web page according to the desires of the Website owner, with such an individualized response being represented by the customized bar code. Thus, preferential treatment may be accorded to specific customers or clients, such as a discount or prize may be offered on a personalized basis according to an amount spent by the user at an earlier time, or according to other preferred criteria. Indeed, the card may be used to effectuate a preferred clients group which is provided with exclusive advantages. A business may supply each member of such an exclusive group with a special scanner for reading bar code 10 and thereafter periodically send to each member a card encoded with the desired offers, invitations or benefits. As indicated hereinbefore, such cards may even be personalized for individual customers or clients. Scanners with their own identity code configured therein as hereinbefore described may be particularly useful for this application as it may serve to provide an indication where or by whom the card was scanned.

In a further preferred embodiment, the card may comprise a website address followed by customer personal identification, to allow the website owner to provide a user customized display according to known purchasing habits of the particular user or other information available, or to allow the user to access a personal account at the given website.

The present embodiments are also useful for providing frequently changing security information such as passwords, entry codes and the like. A weakness of many current security systems is that they are dependent on ID codes, PIN numbers, passwords and the like, which are changed insufficiently frequently due to the inconvenience involved. A method that provides for simple and convenient changing of such key information would provide much additional value to these security systems. Such security systems may be involved in electronic door locks, electronic network login protection, limitation on database access, automatic personnel identification systems, etc. Such an application for bar code 10 may include use as one-time-use identity cards which are refreshed and reprinted periodically. Such one-time-use identity cards are useful in high security environments where there is concern about lost or stolen identification documents. Such one-time-use documents are typically issued on a daily basis to authorized personnel who can verify their identity and authority for access. The card may then be used once only to print out a new one-time-use identity card for use the following day, at which time the original card may cease to be valid. Such cards may typically be printed on PC type printers such as ink jet, laser or bubble jet printers. Accordingly, they may include bar code 10 without concern for the accuracy of the printing. Automated calling cards and Website calling cards are additional uses for bar code 10 as they too have a brief effective life and therefore new cards must be issued with new authorization or validation data periodically.

Bar code 10 adds a dimension to bar code use that does not exist today as a result of its ease of printing and resiliency and accuracy of reading.

Bar code 10 is also useful within methods and a system for authorizing and carrying out a secure financial transaction and for limiting the use of a financial transaction account (bank account, credit account, asset fund, etc.) to an authorized user. The methods involve the use of single-use transaction codes that become nullified for further use after their first use and passwords in conjunction, the transaction codes appearing encoded on single-use code carriers. It is understood that other machine readable codes such as customary bar codes and magnetic strips may also be useful within such methods and system.

Figure 5A:
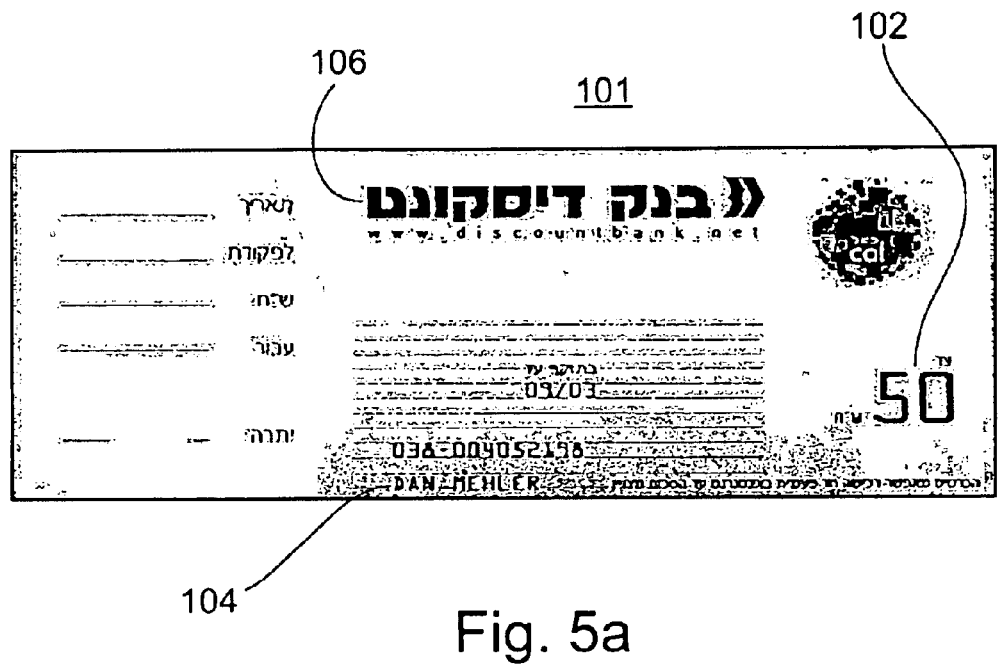
FIG. 5a is a simplified diagram of the front side of a code carrier carrying a bar code, constructed in accordance with an embodiment of the present invention.

Reference is now made to FIG. 5a which shows the front side of a code carrier in accordance with the teachings of the present invention, which is referred to hereinafter as code carrier 101. According to the present embodiment, code carrier 101 is a single-use substrate which resembles a pre-printed payment voucher, gift certificate or check having a predetermined maximum value.

Code carrier 101 may also, within the scope of this invention, take many other forms as well, such as being formed of paper or plastic or any material comprising a substrate upon which writing, printing or embossing may appear, including but not limited to a credit card or facsimile thereof, a business card or facsimile thereof, or a simple piece of paper. Code carrier 101 may preferably but not necessarily contain thereon designations of the predetermined maximum value 102, the identity of the authorized user 104, the issuing financial institution 106, or any other information or graphics the issuer deems desirable. Code carrier 101 may preferably but not necessarily have printed thereon the transaction code. Code carrier 101 may also contain company logos, special promotions or advertising much as telephone debit cards are used today for promotional advertising.

Code carrier 101 has, as its principal purpose, carrying a single-use transaction code, hereinafter referred to as the code, which may be submitted by a user in order to obtain authorization for a financial transaction. The code is preferably, but not necessarily, a unique code, Accordingly, the code is a single-use authenticating means for the purpose of effecting a transaction involving a predetermined sum of money. The relevant predetermined sum preferably appears on the face of code carrier 101 as value 102.

Code carrier 101 is preferably issued by a financial institution or a credit supplier in order to provide a code usable as a secure way to transfer a predetermined sum of money, the code being associated with a relevant bank or asset fund account number or with a valid credit card number. The code is preferably limited to use in a transaction involving a sum of money not exceeding the predetermined sum.

There are many ways that such institutions may provide code carrier 101 to a user. Banks may issue them against the debiting of funds from an account in a comparable amount; asset funds may issue them against a distribution of assets from the fund, credit suppliers may issue them against a comparable charge to a credit card account; etc. Such issuance may be done in many ways, in person or by mail from a bank with payment in the form of a check or other money transfer. A bank or a credit card company may supply such code carriers much as they supply a packet of personal checks, with the value of the transaction code added to the user's credit balance. It is not difficult to imagine the possibility of inserting a credit card into an ATM and the ATM issuing code carrier 101 with a transaction code limited to a desired sum and debiting the user's bank account or credit balance in the same amount.

Code carrier 101 is issued along with at least one authorized user password which is required in order to effect a transaction with the code. Each code preferably has at least one password associated therewith. The password is preferably a four digit number, similar to the ubiquitous PIN, but may be any combination of numbers or letters agreed upon by the issuing institution and the user.

Code carrier 101 may be used in various ways. According to the preferred embodiment, a user may physically take code carrier 101 into a store and present it, along with the password, as payment for the purchase of a product, similar to payment by check. The user has no reason not to reveal the password to the merchant since the number and password cannot be surreptitiously reused. The merchant presents it for payment to the issuing institution in order to receive payment for the product. The validity of code carrier 101 can be confirmed on the spot by the merchant. A user may give code carrier 101 to another to effect a purchase. In this case the user will disclose the password to the other and the other will use it as the user would have used it. A user could mail code carrier 101 as a payment and authorize its execution by disclosing the password in a different manner, such as by telephone. A user could communicate the code and the password electronically via a communications network in order to provide payment to an e-merchant. In short, presentation of the code and the associated password, in whatever form that may occur, is the requirement for effecting a transaction.

Figure 5B:
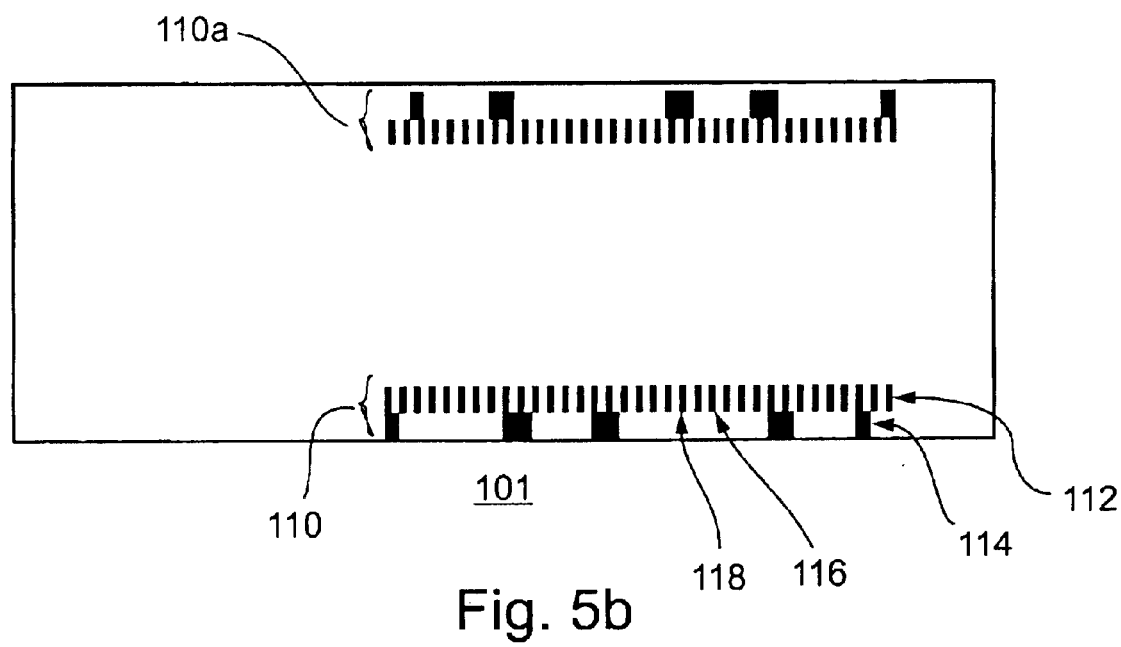

Reference is now made to FIG. 5b which shows the back side of code carrier 101. According to the preferred embodiment, code carrier 101 preferably carries the code by having it printed thereon in an optically readable digital code similar to a bar code, hereinafter referred to as bar code 110. Bar code 110 may also preferably contain an encryption of the transaction code. It is understood that bar code 110 may be printed on any of the embodiments of code carrier 101 indicated hereinabove or on any substrate, including a card, document or surface on which coded data may be printed for reading by a reader. The code may also be held in a magnetic strip or in a smart card type chip.

Bar code 110 appears close to the edge of code carrier 101 in order to allow it to be scanned by a scanner, as described more fully hereinafter. It is noted that a bar code identical to bar code 110, hereinafter referred to as bar code 110a appears in proximity to the opposite edge of code carrier 101 Bar code 110 and bar code 110a are disposed and oriented identically with respect to their respective edges so that either edge of code carrier 101 may be inserted into the scanner with the result that the relevant bar code will be read According to the preferred embodiment, bar code 110 includes two linear rows juxtaposed to one another. One row is a calibration row, hereinafter referred to as calibration row 112, and the other row is a data row, hereinafter referred to as data row 114. Calibration row 112 provides a calibration for reading encoded data from data row 114. It is understood that bar code 110 may also include additional rows which may also be disposed in such a manner that one row provides a calibration for reading encoded data from an adjacent row. It is further understood that the rows need not be linear, but may be arranged in any configuration that maintains the calibration relationship one to another and that provides access for optical reading.

Calibration row 112 and data row 114 both comprise printed spaces, hereinafter referred to as printed space 116, and non-printed spaces, hereinafter referred to as non-printed space 118. According to the preferred embodiment, printed space 116 is arranged in substantially rectangular form. It is appreciated that printed space 116 may be arranged in other forms, according to the requirements of the relevant use and provided that it is readable.

Each row of bar code 110 consists of a series of printed spaces 116 and non-printed spaces 118, with the rows juxtaposed to each other such that the printed spaces 116 and the non-printed spaces 118 of one row are disposed next to, and provide a reference for, the printed spaces 116 and the non-printed spaces 118 of the other row. It is this referential juxtaposition of spaces that carry the data within the code.

The printed spaces 116 and the non-printed spaces 118 of calibration row 112 serve to align the reader and provide a series of reference points from which to begin reading. Such reference points are repeated throughout calibration row 112 in order to realign the reader to the juxtaposed spaces to be read. This calibration function is essential because bar code 110 is read sequentially from one end to the other, and only the referentially juxtaposed printed and non-printed spaces are read. There are no gaps between such spaces. Any imprecision of spacing simply results in a mis-sized printed or non-printed space, which has no meaning to the scanner, unlike typical bar codes in which the spacing has a meaning and a mis-sized gap results in misread data.

This feature allows bar code 110 to be printed by printers that print by passing a substrate across a printing head, such as laser, ink jet or dot matrix printers. Because each code is preferably different from every other code, each imprint of bar code 110 will be different from every other imprint of bar code 10. Such individualized printing is typically done on the above-listed types of printers, and may be prone to irregularities in printing as a result of mistimed positioning of the variable data, non constant printer feed speeds or other mechanical causes.

This feature further allows bar code 110 to be sent by fax machine without compromising the integrity of the data carried. Current bar codes that are faxed are typically useless, as the slight differences in the paper feed speeds of the sending and receiving fax machines may result in mis-spaced lines and gaps between the lines. Bar code 110 is not effected by irregularities in the size of the printed and non-printed spaces.

Typical bar codes which are part of a uniform printing run of identical data printed by offset printers are usually precise and uniform. Such bar codes are read by readers which read both the lines and the gaps between the lines. Each imprint of bar code 110 has unique or variable data and differences in its content which requires a change in the configuration of printed and non-printed spaces for every unit printed. As a result, bar code 110 may be imprecise, containing varying gaps between the printed spaces 16. Such gaps comprise the unprinted spaces 18, the size of which has no meaning. It is a feature of bar code 110 to be calibrated to signal the reader to know when each new printed space 116 begins. Therefore spacing between sequential printed spaces 116 is not an issue. This calibration is repeated periodically throughout the length of the rows.

As stated earlier herein, printed spaces 116 and non-printed spaces 118 of calibration row 112 provide a reference for printed spaces 116 and non-printed spaces 118 of data row 114. For example, a printed space 116 of calibration row 112 may be adjacent to and therefore refer to either a printed space 116 or a non-printed space 118 of data row 114, resulting in a black-black or black-white configuration respectively. Similarly, a non-printed space 118 of calibration row 112 may refer to either a printed space 116 or a non-printed space 118 of data row 114, resulting in a white-black or white-white configuration respectively. This referential juxtaposition of the spaces in one row with the spaces in the other row carries the data within bar code 110.

Bar code 110 is decodable to a binary code. Therefore, the variables needed are limited. The above described referential juxtaposition of two rows results in only two possible combinations of printed and non-printed spaces, each of which corresponds either to the "1" or the "0" of the binary code. According to the preferred embodiment, a same color configuration, such as white-white or black-black is preferably read as a "0", a different color configuration, such as black-white or white-black is preferably read as a "1". Other ways of mapping binary symbols onto the printed/non-printed space combinations may be considered by the skilled person. Binary codes are well known in the art and therefore do not require further explanation herein.

The binary code is decodable to data. According to the preferred embodiment, the data consists of numbers constituting the code. It is understood that the binary coded data may also be letters of the alphabet or symbols and may preferably constitute an encryption of a user password, a predetermined sum which is a transaction limit amount or an arbitrary number associated with a user.

The binary code and the data it represents are storable on an electronic medium, which, according to the preferred embodiment, comprises at least two network enabled communication units capable of transmitting and receiving the code via a communications network, and a communications network. According to the preferred embodiment, the communications network is the Internet and the communication units are user clients which may perform all applications that are within their capability, including storing data in a database, the data preferably including the code and the password.

Figure 6:
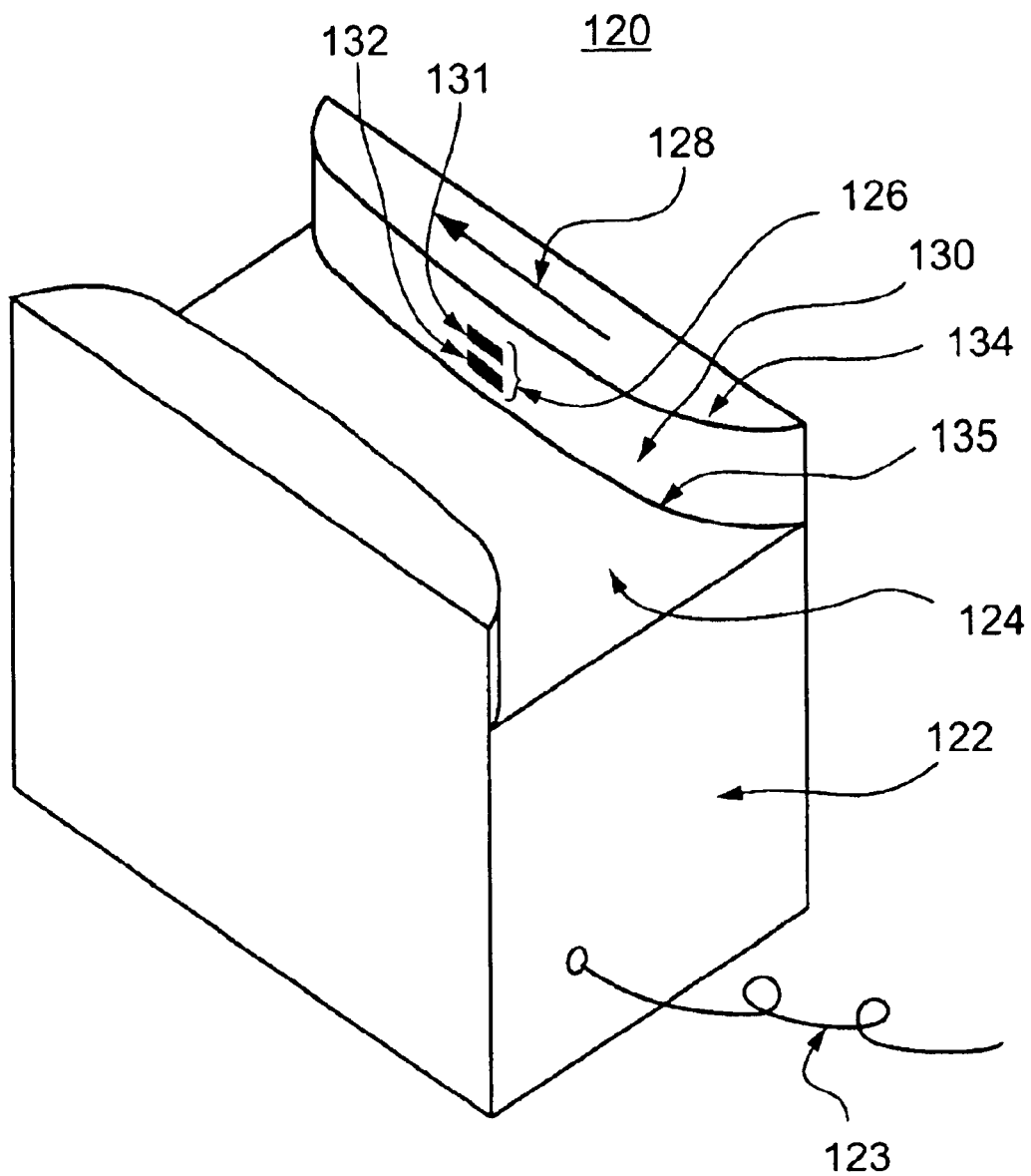
FIG. 6 is a simplified diagram showing a perspective view of a scanner for reading the code carrier of FIG. 5.

Reference is now made to FIG. 6 which shows an optical scanner, hereinafter referred to as scanner 120, which is similar in physical configuration to a magnetic card reader wherein a magnetic strip on a card is swiped through a slot and is read as it passes a reader within the slot. According to the preferred embodiment, scanner 120 includes a body or console, hereinafter referred to as body 122, which is connected to a user client by a hard wire connection 123. Body 122 has disposed thereon a guidance slot, hereinafter referred to as slot 124, through which code carrier 101 is passed in order for bar code 110 to be read by an optical reader, hereinafter referred to as reader 126. Reader 126 is similar to bar code readers well known in the art and is typically infrared or light or laser based, converting an optical signal into an electrical signal. The technology of such optical readers is well known to the skilled person and therefore requires no further description herein.

Body 122 also has indicated thereon in close proximity to slot 124 a direction pointer in the form of an arrow, hereinafter referred to as direction indicator 128, indicating the direction in which substrate 111 is to be introduced into slot 124 in order for bar code 110 to be read in the proper sequence by reader 126. Reader 126 is disposed upon reading face 30, which is disposed within slot 124, such that bar code 110 passes over it when code carrier 101 is passed through slot 124 and across reading face 130. The location of reader 126 on reading face 130 corresponds in spacing to the location of bar code 110 on code carrier 101 such that when code carrier 101 is fully inserted into slot 124, bar code 110 aligns with reader 126.

It is understood that the abovedescribed configuration of scanner 120 is solely exemplary and scanner 120 may be configured otherwise. For example, scanner 120 may be housed within a user client and connected thereto internally, with only slot 124 extending visibly, in which case it is employed as described above. Scanner 120 may also be configured as a hand-held scanner, in which case it preferably has a directional and placement aid such as a channel or an extending ridge or flange in order to provide physical guidance to code carrier 101 as it passes over reading face 130 such that bar code 110 may pass directly over reader 126 and be read.

Reader 126 is located a predetermined distance from the top edge of reading face 130, hereinafter referred to as top edge 134, and from the bottom edge of reading face 130, hereinafter referred to as bottom edge 135. Scanner 120 is designed to read bar code 110 which, according to the preferred embodiment, contains two juxtaposed rows. Accordingly, reader 126 preferably consists of two optical reading heads, hereinafter referred to as upper optical reading head 31 and lower optical reading head 132 respectively. Upper optical reading head 131 and lower optical reading head 132 are juxtaposed to one another and disposed upon reading face 130 such that upper optical reading head 131 reads calibration row 112 and lower optical reading head 132 reads data row 114. According to the preferred embodiment, upper optical reading head 131 and lower optical reading head 132 are positioned with respect to the top edge 134 and bottom edge 135 of reading face 130 such that they align with calibration row 112 and data row 114 respectively when code carrier 101 is passed through slot 124. To assure such alignment, the distance between reader 126 and bottom edge 135 is equal to the distance between bar code 110 and its proximal edge of code carrier 101. In this respect, it is noted that bar code 110 appears twice on,code carrier 101, each time positioned with respect to a proximal edge of code carrier 101 such that either of the two proximal edges of code carrier 1 may be passed through slot 124 in order to cause bar code 10 to be read.

It is understood that the relative positions of calibration row 112 and data row 114 may change in different embodiments of bar code 110 and therefore the relative positions of upper optical reading head 131 and lower optical reading head 132 may also change in order to remain consistently aligned according to the configuration of bar code 110. It is further understood that the distance between bar code 110 and the proximal edge of card carrier 101, as well as the distance between lower optical reading head 132 and bottom edge 135, may change in further embodiments. The embodiments contemplate all such variations in configuration and disposition, provided that such embodiments cause alignment between bar code 110 and reader 126.

When bar code 110 is passed over reader 126, both upper optical reading head 131 and lower optical reading head 132 read their respective rows sequentially, and both rows are read simultaneously. Upper optical reading head 131 and lower optical reading head 132 are controllably joined together such that the referential juxtaposition of the optical signals respectively read from calibration row 112 and data row 114, either same color or different color, produces the required electrical signal indicating the binary code which represents the calibrated data carried by barcode 110. According to the preferred embodiment, the calibrated data carried by the code consists of numbers constituting the transaction code.

In addition to reading bar code 110, scanner 120 is designed to convert the code to data and to output that data to a user client. In this respect, scanner 120 employs current technology to both convert the optical signal read to an electrical signal and to send that electrical signal for use and storage on an electronic medium according to the current application. Scanner 120,similar to scanner 20 hereinbefore described, may preferably be configured with an identity code which serves to identify it and which is similarly converted to an electrical signal and outputted along with the data.

Figure 7:
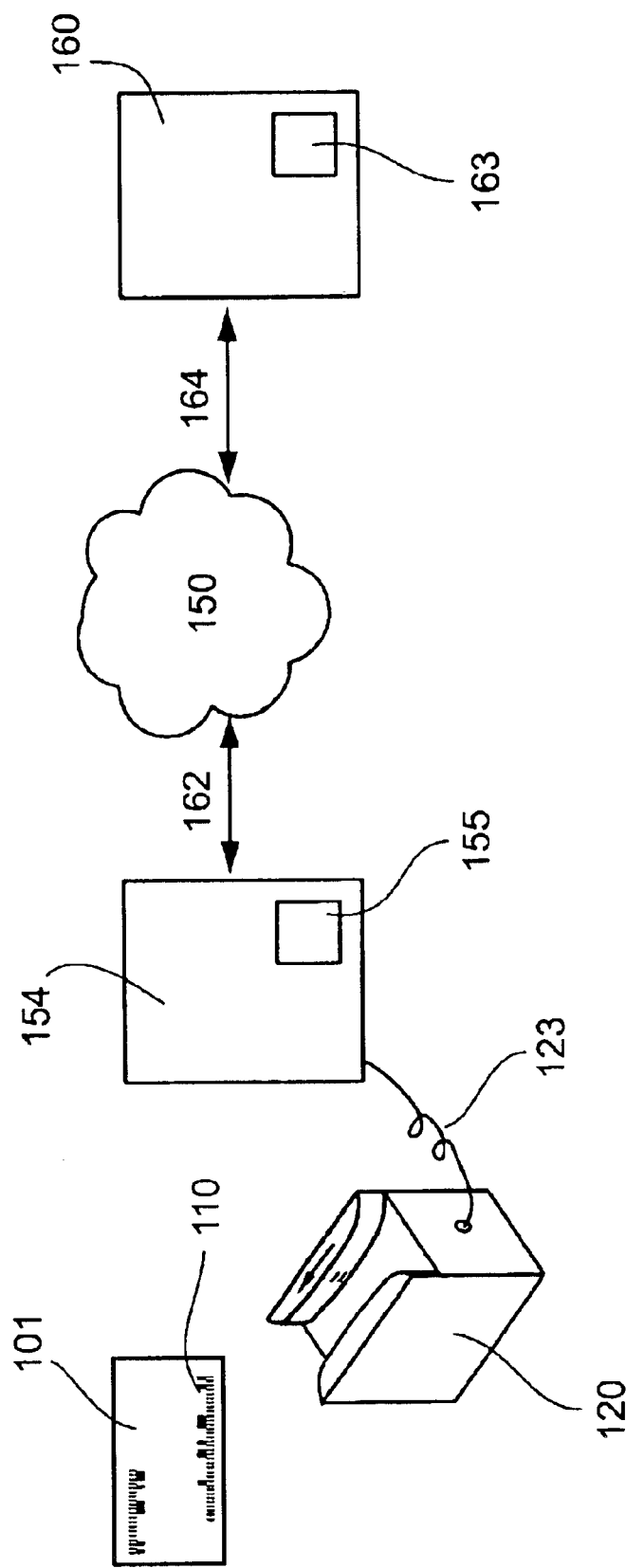
FIG. 7 is a simplified schematic diagram illustrating a communication system in accordance with a preferred embodiment the present invention.

Reference is now made to FIG. 7, which depicts, in schematic form, the system architecture of a transaction in accordance with the preferred embodiment of the present invention. According to the preferred embodiment, a user enters a store, selects a purchase and presents code carrier 1 for payment. The merchant swipes code carrier 101 through scanner 120. The code is converted, as described hereinbefore, to the transaction code which is transmitted to a network enabled communication unit belonging to the merchant, typically a computer connected to the Internet, hereinafter referred to as computer 154. According to the preferred embodiment, data is transmitted by scanner 120 via hardwire connection 123, although it is understood that scanner 120 may alternatively be designed to send data to computer 154 by wireless connection such as Infrared or Radio Frequency, and therefore may be configured with a wireless port. In such a case, computer 154 may also be configured for wireless communication and may be equipped with compatible communication ports.

The user may also disclose the password associated with the transaction code, which the merchant enters into computer 154. It is understood that the digital code may also contain an encryption of the password, in which case computer 154 can immediately indicate a match between the encrypted password and the password entered by the user.

In an alternate embodiment, the transaction code may be printed visibly on the code carrier and the digital code may contain an arbitrary number assigned to the transaction account. According to this embodiment the transaction code is entered manually and is solely for seeking authorization for the transaction and the digital code identifies the transaction account.

Computer 154, upon receiving the transaction code from scanner 120, transmits it, along with the password, over a modem link 162 connecting to a communications network, hereinafter referred to as Internet 150, and therefrom over link 164 to a second network enabled communication unit operated by the user's credit supplier, typically a networked computer, and hereinafter referred to as computer 160. It is understood that the merchant may be totally unaware that the transaction code that he is transmitting is not a permanent credit card number, but a single-use code. For the purpose of the transaction, the nature of the instrument of credit is completely transparent to the merchant and adds another level of security to the transaction.

The credit supplier maintains a database 163 within or linked to computer 160 containing permanent credit card numbers for each client. These credit card numbers are linked to the single-use transaction codes associated therewith as printed on the code carriers 101 issued to each client and are also linked to the password associated with each transaction code. The credit supplier checks the transaction code and password submitted against a list of single-use transaction codes associated with the user's permanent credit card number in database 163. If the information matches, the credit supplier credits the merchant with a payment order conveyed by accepted business channels, while debiting the account of the user, deletes the used transaction code from a list of transaction codes assigned to the user, or otherwise nullifies that specific transaction code for further use, and conveys the authorization of the transaction to the merchant by reversing the transmissions used by the merchant to seek verification. The authorization is displayed on GUI 155 of computer 154. The merchant may now deliver the goods in order to complete the transaction.

Such a credit transaction, which is completed by an authorized user without any permanent credit card number being disclosed or transmitted electronically, obviates the need for digital signatures, PKI technologies, and other authentication systems and procedures which are prone to interception, decryption, and like hacking attacks. Moreover, it adds a further layer of protection against unscrupulous merchants who inflate credit charges. If a charge is enlarged beyond the predetermined value, the credit supplier will refuse payment to the vendor and the deal will not be authorized.

Figure 8:
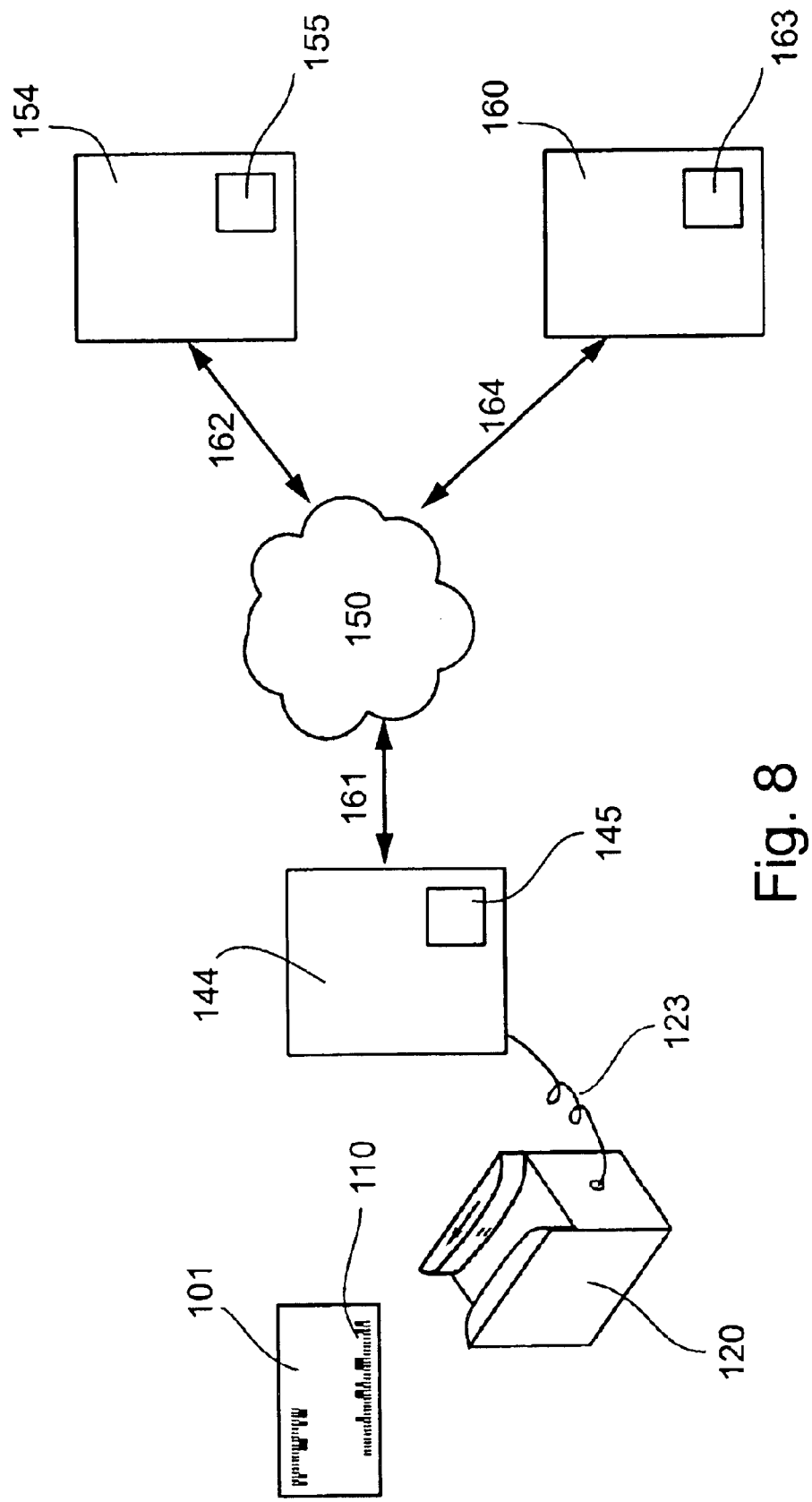
FIG. 8 is a simplified schematic diagram illustrating a communication system in accordance with an alternate embodiment the present invention.

Reference is now made to FIG. 8 which depicts, in pictorial form, the system architecture of a model of a transaction in accordance with an alternate embodiment of the present invention. According to this embodiment, a user carries out an electronic purchase from the website of a merchant.

As used herein, the term "Website" refers to at least one Web page, and preferably a plurality of Web pages, virtually connected to form a coherent group of interlinked documents. As used herein, the phrase "Web page" refers to any document written in a mark-up language including, but not limited to, HTML (hypertext mark-up language) or VRML (virtual reality modeling language), dynamic HTML, XML (extended mark-up language), WML, or related computer languages thereof, as well as to any collection of such documents reachable through one specific Internet address or at one specific World Wide Web site, or any document obtainable through a particular URL (Uniform Resource Locator). More generally the embodiment relates to any circumstance in which the user and the merchant are located remotely from each other but are connected electronically.

The transaction is carried out from the user's personal network enabled communication unit, hereinafter referred to as PC 44, which is equipped with or linked to a scanner 120 for reading barcode 110. The transaction commences by a user pulling up the Website of a merchant for viewing on GUI 145 of PC 144, selecting the product to be purchased and accessing the Webpage used for payment purposes. The user indicates payment by credit card. The user swipes code carrier 1 through scanner 120, which reads bar code 110, converts the digital code to the transaction code and transmits it to PC 144 for insertion into the appropriate screen on the payment Web page. Similar to the preferred embodiment, the transaction code is transmitted by scanner 120 via hardwire connection 123, although it is understood that scanner 120 may alternatively be configured to be internal to PC 144 or designed to send data to PC 144 by wireless communication such as Infrared or Radio Frequency. The user then enters the password assigned by his credit supplier into the appropriate screen on the payment Web page.

PC 144 transmits the purchase order, including the transaction code and the password, over modem link 161 connecting to the Internet 150 and therefrom over link 162 to a second network enabled communication unit operated by the merchant, hereinafter referred to as computer 154. The purchase order sent by the user then appears on GUI 155 of computer 154 and is processed as a conventional credit card type of payment for goods or services.

In order to process the purchase, the merchant must first verify the validity of the transaction code, which appears to the merchant as a credit card number. Again, as in the transaction according to the preferred embodiment, the merchant is totally unaware that the transaction code is not a permanent credit card number, but a single-use code. Accordingly, the merchant transmits the transaction code and the password for verification via link 162 to the Internet 150 and therefrom via link 164 to a third network enabled communication unit operated by the user's credit supplier, hereinafter referred to as computer 160. Computer 160 either has or is linked to a database, hereinafter referred to as database 163, which contains permanent credit card numbers for each client. These credit card numbers are linked to the list of single-use transaction codes associated therewith as printed on the code carriers 1 issued to each client and are also linked to the password associated with each transaction code. The credit supplier checks the transaction code and password submitted against the list of transaction codes stored with the user's permanent credit card number in database 163. If the information matches, the credit supplier credits the merchant with a payment order conveyed by accepted business channels, while debiting the account of the user, deletes the used transaction code from the list of transaction codes assigned to the user, or otherwise nullifies that specific transaction code for further use, and conveys the authorization of the transaction to the merchant by reversing the transmissions used by the merchant to seek verification. The merchant then issues a confirmation message to the user over link 162 to the Internet 150 where it is downloaded by user 112 over link 161 and displayed on GUI 145 of PC 144. The merchant then completes the transaction by normal business methods, such as arranging for delivery of the goods or services ordered.

In this alternate embodiment, fraud by an unscrupulous merchant is also prevented. Because the merchant does not see code carrier 101, it is not known that the transaction code is limited to a specific amount. Hopefully, the merchant will report and seek authorization for the actual amount of the transaction. However, if the amount is unlawfully enlarged beyond the predetermined amount, the credit supplier will refuse authorization.

Figure 9:
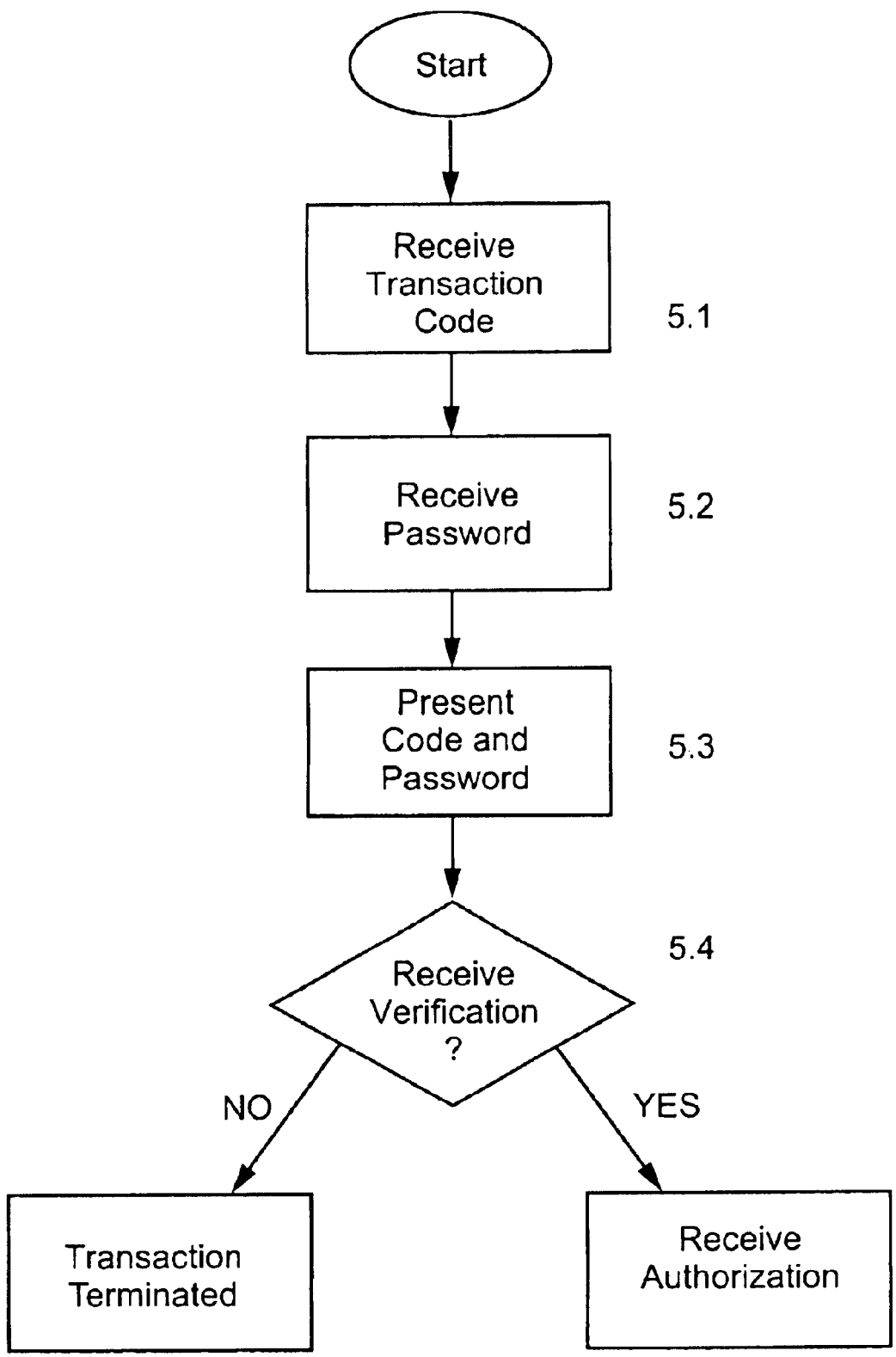
FIG. 9 is a flow chart illustrating the method in accordance with a preferred embodiment of the present invention as effected by a user of the code carrier of FIG. 5.
Figure 10:
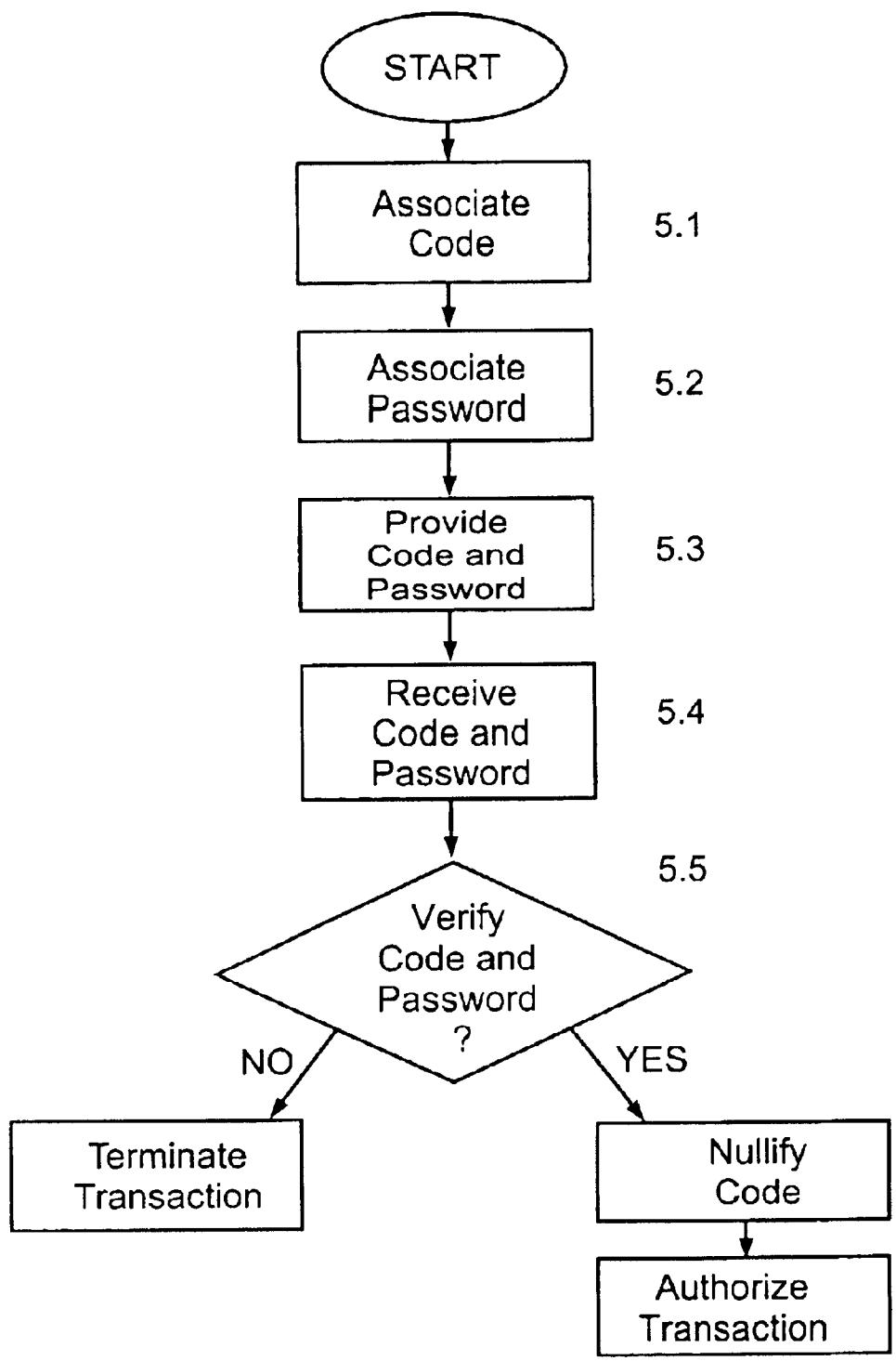
FIG. 10 is a flow chart illustrating the method in accordance with a preferred embodiment of the present invention as effected by an issuer of the code carrier of FIG. 5.
Figure 11:
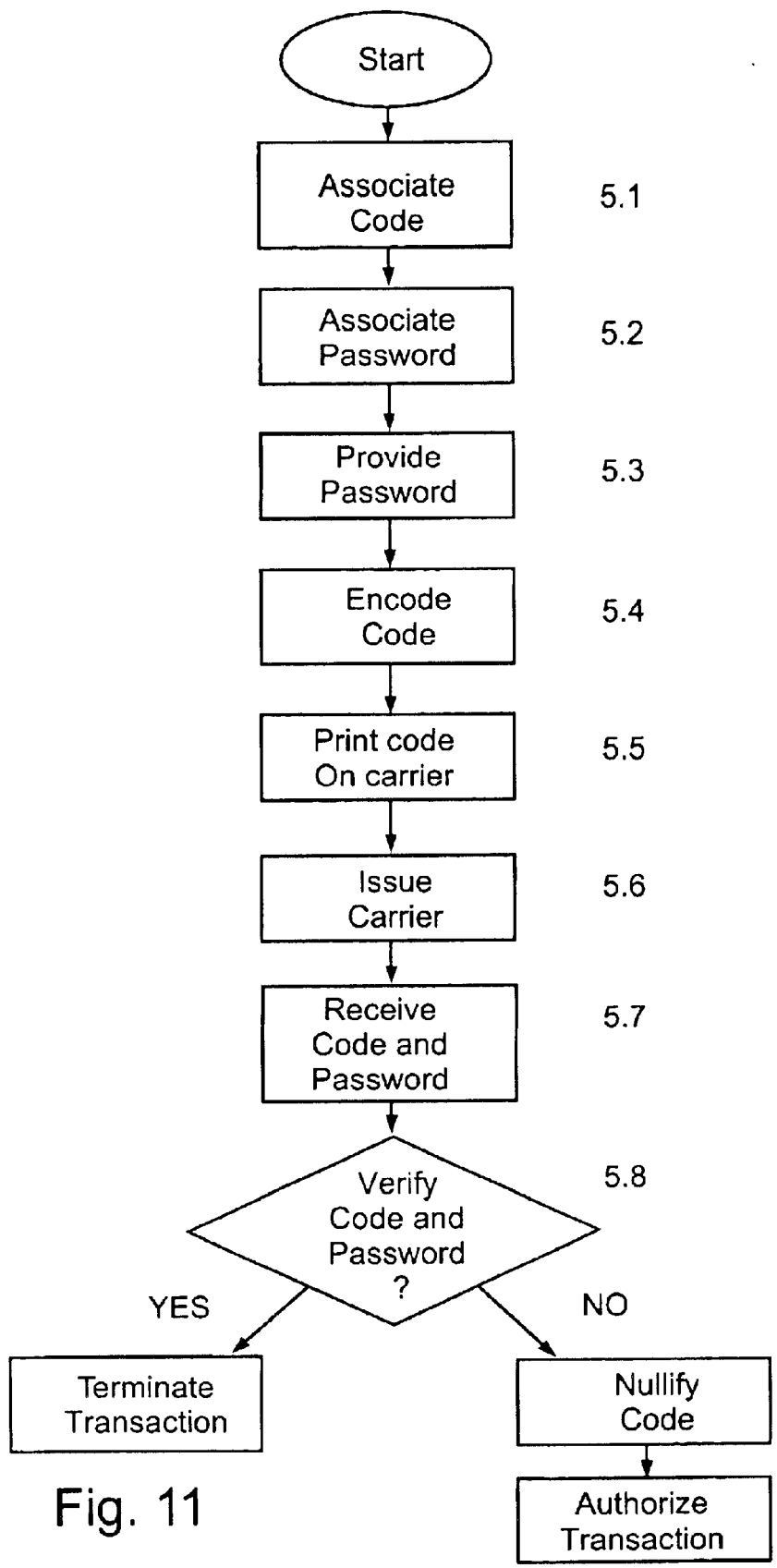
FIG. 11 is a flow chart illustrating the method in accordance with an alternate embodiment of the present invention as effected by an issuer of the code carrier of FIG. 5.

The effectuation of the preferred and the alternate embodiments are further illustrated by the flow charts provided as FIGS. 9, 10 and 11. Reference is made to FIG. 9 which illustrates a transaction according to a preferred embodiment as effected by a user of a transaction code. In step 1, the user receives a transaction code associated with his credit account from a credit supplier. In step 2, the user receives an authorized password associated with the transaction code. The user presenting the transaction code and the password to a merchant as payment for a product constitutes step 3. The merchant presents the transaction code and the password for verification. The receipt or refusal of verification is step 4. If verification is received, the transaction is authorized. If verification is refused, the transaction is terminated.

Reference is made to FIG. 10 which illustrates a transaction according to a preferred embodiment as effected by an issuer of code carrier 1. In step 1, a credit supplier associates a transaction code with a credit account and with a predetermined maximum limit sum of money. In step 2, the credit supplier associates a password with the transaction code. Providing the transaction code and the password to the user constitutes step 3. The user presents the transaction code and the password to a merchant as payment for a product and the merchant submits the transaction code and the password to the credit supplier for verification. Step 4 is the receipt by the credit supplier of the transaction code and the password. Verifying or declining to verify is step 5. If the credit supplier verifies the code and the password, it nullifies the transaction code for further use and authorizes the transaction. If the credit supplier does not verify the code and the password, it terminates the transaction.

Reference is now made to FIG. 11 which illustrates a transaction according to an alternate embodiment as effected by an issuer of code carrier 1. In step 1, a credit supplier associates a transaction code with a credit account and with a predetermined maximum limit sum of money. In step 2, the credit supplier associates a password with the transaction code. Providing the password to the user constitutes step 3. In step 4, the credit supplier encodes the transaction code into an optically readable digital code, and, in step 5, prints the digital code on a code carrier. In step 6, the credit supplier issues the code carrier to a user of the credit account. The user wishes to conduct a credit purchase from an electronic merchant. After accessing the merchant's Website and selecting the product, the user swipes the code carrier through a scanner and enters the password in order to pay for the product selected. The transaction code and the password are communicated electronically to the merchant and the merchant, in turn, transmits them electronically to the credit supplier for verification. Step 7 is the receipt by the credit supplier of the transaction code and the password. Verifying or declining to verify is step 8. If the credit supplier verifies the code and the password, it nullifies the transaction code for further use and authorizes the transaction. If the credit supplier does not verify the code and the password, it terminates the transaction.

A further alternate embodiment of the system of the invention includes issuing cards containing the URL of a Website within barcode 110 along with code carrier 101. When such a card is swiped through a scanner, the URL is transmitted to a user's computer which is programmed to access the Website. Such cards so encoded may be distributed freely to the clients of credit card suppliers or merchants in order to encourage and facilitate consumer spending much like vendors generally send printed catalogs to their clients along with the monthly bills. Such cards are well suited for use with code carriers in accordance with the system of the invention since they add much value and extend advertising possibilities to merchants and, thus, to credit suppliers. Potential buyers can automatically and effortlessly access business Websites and be exposed to dynamic, multi-media presentations of goods and services, including special offers, prizes, promotional events, and the like, something more interesting and potentially more valuable to a potential buyer than just leafing through a printed catalog.

For example, if a user wishes to purchase an arm-chair from a firm whose card he has acquired, perhaps as a free hand-out with a catalog of goods, it is only necessary for the user to insert the card into a scanner to immediately download the URL of the sponsor over the Internet, perhaps a Website displaying sample chairs in various styles. By clicking one of the items from the interactive display of the Website, the software calls up another specific Web page giving even more details and providing an order form for that item. By typing in his password and swiping a code carrier through scanner 120, the user provides the vendor with the data needed to close the deal and enable payment for goods or services ordered. The user need not be familiar with PCs or browsers or the like to use this method of making purchases since the software makes all the necessary connections.

This embodiment, which combines using a coded card along with a code carrier carrying a transaction code, shares the concept of utilizing identification numbers encoded in a optically readable digital code. The method is user-friendly, efficient and safe. Both maintaining a contact and transacting e-commerce can be combined to empower more people to use the Internet, visit Websites, and conduct e-commerce transactions, all with little or no advance knowledge of the technology involved.

According to the preferred embodiment and both of the alternate embodiments described, a user is not exposed to risk by divulging credit card information, since a credit card number is not sent out over the Internet where it might be intercepted. Misappropriation of a password by itself is also of no value to a thief. If the transaction code which has been transmitted over the Internet is also intercepted, it is worthless even with the password, since the code can only be used the one time. Even if the code carrier is stolen, it cannot be used by the thief since it is useless without the password of the owner, in the same way that a stolen credit card will not of itself allow a thief to withdraw cash from a bank ATM without providing the correct PIN. This feature also solves the problem of authentication over the Internet.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. Accordingly, it is intended to embrace all such alternatives, modifications and variations that fall within the spirit and broad scope of the appended claims.

What is claimed is:

1. An optically readable printed digital code comprising in spatial association on a substrate a calibration row and a data row, data of said calibration row and said data row being arranged in referential juxtaposition such that data of said calibration row provides a calibration for reading encoded data held in said data row, wherein said rows are readable by an optical scanner having at least two optical reading heads controllably joined together and disposed side by side for reading said rows simultaneously.

2. The digital code of claim 1, further comprising at least one additional data row arranged such that said calibration row provides a calibration for reading encoded data from said at least one additional data row.

3. The digital code of claim 1, wherein said rows are linear rows.

4. The digital code of claim 1, wherein said calibration row and said data row comprise a single printing alignment.

5. The digital code of claim 2, wherein said calibration row is juxtaposed to said first data row and said at least one additional data row, said calibration row serving as a reference to said data rows.

6. The digital code of claim 5, wherein each of said rows comprises printed spaces and non-printed spaces.

7. The digital code of claim 6, wherein each of said printed spaces is arranged in substantially rectangular form.

8. The digital code of claim 6, wherein each space in said data row is aligned to correspond to a respective space of said calibration row.

9. The digital code of claim 8, wherein said calibration row comprises regularly alternating printed and non-printed spaces.

10. The digital code of claim 9, wherein said data row comprises data dependent printed and non-printed spaces such as to carry data as a same/different contrast between corresponding spaces of said calibration and data rows.

11. The digital code of claim 1, wherein each of said rows is readable sequentially from one end to the other end.

12. The digital code of claim 1, comprising a binary code.

13. The digital code of claim 12, decodable for storage on an electronic medium, said binary code encoding data characters.

14. The digital code of claim 13, wherein said data characters comprise one or more of the group consisting of numbers, letters of the alphabet and symbols.

15. The digital code of claim 1, wherein said scanner is for reading said rows from one end to the other end.

16. The digital code of claim 1, wherein said scanner is for converting said code to data and outputting said data.

17. The digital code of claim 1, wherein said data comprises identification information.

18. The digital code of claim 1, wherein said data comprises personal information.

19. The digital code of claim 18, wherein said personal information includes a telephone number.

20. The digital code of claim 18, wherein said personal information includes security related data.

21. The digital code of claim 1, wherein said data comprises a Worldwide Web site address.

22. The digital code of claim 1, wherein said data comprises information relevant to a commercial product.

23. The digital code of claim 1, wherein said substrate comprises paper.

24. The digital code of claim 1, wherein said substrate is a pre-printed business card.

25. The digital code of claim 1, wherein said substrate is a pre-printed label.

26. The digital code of claim 1, wherein said substrate includes an adhesive.

27. A scanner having at least two optical reading heads controllably joined together and disposed side by side for reading code comprising juxtaposed rows of printed spaces and non-printed spaces on a substrate, the reading heads being controllably associated together to use one of said juxtaposed rows as a positional reference for reading data of said code from said juxtaposed rows, wherein said optical reading heads simultaneously read said code along said rows.

28. The scanner of claim 27, further comprising a converter for converting said code to data.

29. The scanner of claim 27, wherein said at least two optical reading heads are disposed at a side of the scanner.

30. The scanner of claim 27, wherein said at least two rows are juxtaposed linear rows, said row serving as a reference being a calibration row for at least one data row, said data being carried within said code by referential juxtaposition of said printed spaces and said non-printed spaces.

31. The scanner of claim 27, being for reading said rows sequentially from one end to the other end.

32. The scanner of claim 27, wherein said code comprises a binary code decodable for storage on an electronic medium, said binary code representing data, said data consisting of numbers, letters of the alphabet and/or symbols.

33. The scanner of claim 32, wherein said data comprises identification information.

34. The scanner of claim 32, wherein said data comprises personal information.

35. The scanner of claim 34, wherein said personal information includes a telephone number.

36. The scanner of claim 34, wherein said personal information comprises security related data.

37. The scanner of claim 32, wherein said data comprises a worldwide Web site address.

38. The scanner of claim 32, wherein said data comprises information relevant to a commercial product.

39. The scanner of claim 27, wherein said substrate comprises paper.

40. The scanner of claim 27, wherein said substrate is a pre-printed business card.

41. The scanner of claim 27, wherein said substrate is a pre-printed label.

42. The scanner of claim 27, wherein said substrate includes an adhesive.

43. A communication system comprising:
  (a) an optically readable printed digital code disposed on a substrate, said code comprising a calibration row and at least one data row in referential juxtaposition thereto, said calibration row providing a calibration for reading said at least one data row;
  (b) a scanner having a reader with at least two optical reading heads controllably joined together and disposed side by side for reading said code and for converting said code to network communication address information and for outputting said network communication address information; and
  (c) a communication enabled client unit for receiving said network communication address information and for accessing a corresponding network communication address.

44. The communication system of claim 43, wherein said data comprises at least one telephone number.

45. The communication system of claim 43, wherein said data comprises at least one Web site address.

46. The communication system of claim 43, wherein said communication unit is a user client.

47. The communication system of claim 43, wherein said communication unit is a telephone dialer.

48. The communication system of claim 43, wherein said rows are linear rows comprising printed spaces and non-printed spaces.

49. The communication system of claim 48, wherein said calibration row is juxtaposed to said at least one data row and serves as a reference thereto, said data being carried within said code by said referential juxtaposition of said printed spaces and said non-printed spaces.

50. The communication system of claim 43, wherein said code comprises a binary code decodable for storage on an electronic medium, said binary code encoding data characters.

51. The communication system of claim 50, wherein said data characters comprise one or more of the group consisting of numbers, letters of the alphabet and symbols.

52. The communication system of claim 43, wherein said client unit is selected from the group consisting of a computer, a POS (point of sale) system, a portable computing device such as a PDA, a cellular telephone having Internet capability and a Web TV.

53. The communication system of claim 43, wherein said client unit includes a database for storing data, said network communication address information being stored in said database.

54. The communication system of claim 43, wherein said scanner is for reading said rows sequentially from one end to the other end.

55. The communication system of claim 43, wherein said scanner is for reading said rows simultaneously.

56. The communication system of claim 43, wherein said substrate is a pre-printed business card.

57. The communication system of claim 43, wherein said code provides access to a remotely located database entry associated with a user.

58. The communication system of claim 57, wherein said database entry is enabled for automatic data output.

59. A method of storing data as a bar code comprising:
(a) converting data to a series of binary data bits;
(b) setting a calibration row comprising regularly alternating printed spaces and non-printed spaces, such that each space is assigned a printed state or a non-printed state;
(c) for successive positions opposite respective spaces in said calibration row, encoding a successive one of said series of binary data bits using said corresponding calibration row space state and a state of said bit, thereby to compile a data row comprising printed spaces and non-printed spaces based upon said data such that said alternating printed spaces and non-printed spaces of said calibration row provide a referential juxtaposition for reading said data-based printed spaces and non-printed spaces; and
(d) printing said calibration row and said data row on a substrate.

60. The method of claim 59, wherein said printing is carried out by a printer that prints line by line.

61. The method of claim 59, wherein said rows are linear rows.

62. The method of claim 59, wherein said calibration row and said data row comprise a single printing alignment.

63. The method of claim 59, wherein said binary code is decodable for storage on an electronic medium, said binary code encoding data characters.

64. The method of claim 63, wherein said data characters comprise one or more of the group consisting of numbers, letters of the alphabet and symbols.

65. The method of claim 59, wherein said rows are readable by an optical scanner having a reader comprising at least two optical reading heads controllably joined together and disposed side by side for reading said rows simultaneously.

66. The method of claim 59, wherein said data comprises identification information.

67. The method of claim 59, wherein said data comprises personal information.

68. The method of claim 59, wherein said data comprises security related information.

69. The method of claim 59, wherein said data comprises a Worldwide Web site address.

70. The method of claim 59, wherein said data comprises information relevant to a commercial product.

71. The method of claim 59, wherein each of said printed spaces is arranged in substantially rectangular form.

72. The method of claim 59, wherein said substrate comprises paper.

73. The method of claim 59, wherein said substrate is a pre-printed business card.

74. The method of claim 59, wherein said substrate is a pre-printed label.

75. The method of claim 59, wherein said substrate includes an adhesive.

* * * * *